US012801710B2

(12) United States Patent
Wakakusa

(10) Patent No.: US 12,801,710 B2
(45) Date of Patent: Nov. 17, 2026

(54) INFORMATION PROCESSING APPARATUS, INFORMATION PROCESSING SYSTEM, INFORMATION PROCESSING METHOD, AND STORAGE MEDIUM

(71) Applicant: NEC Corporation, Tokyo (JP)

(72) Inventor: Ryuji Wakakusa, Tokyo (JP)

(73) Assignee: NEC CORPORATION, Tokyo (JP)

(*) Notice: Subject to any disclaimer, the term of this patent is extended or adjusted under 35 U.S.C. 154(b) by 17 days.

(21) Appl. No.: 18/843,381

(22) PCT Filed: Mar. 18, 2022

(86) PCT No.: PCT/JP2022/012741
§ 371 (c)(1),
(2) Date: Sep. 3, 2024

(87) PCT Pub. No.: WO2023/175942
PCT Pub. Date: Sep. 21, 2023

(65) Prior Publication Data
US 2025/0173412 A1 May 29, 2025

(51) Int. Cl.
*G06F 21/32* (2013.01)

(52) U.S. Cl.
CPC .................................... *G06F 21/32* (2013.01)

(58) Field of Classification Search
CPC ................................. G06F 21/32; G06F 21/62
See application file for complete search history.

(56) References Cited

U.S. PATENT DOCUMENTS

| | | | | |
|---|---|---|---|---|
| 6,636,973 | B1 * | 10/2003 | Novoa | G06F 21/32 340/5.82 |
| 8,015,118 | B1 * | 9/2011 | Robinson | H04L 63/0861 705/76 |
| 9,142,070 | B2 * | 9/2015 | Hanna | G07C 9/37 |
| 9,531,707 | B1 * | 12/2016 | Daniel | H04L 63/0428 |
| 9,892,732 | B1 * | 2/2018 | Tian | G10L 15/24 |
| 9,928,839 | B1 * | 3/2018 | Lester | H04L 63/0861 |
| 10,198,924 | B1 * | 2/2019 | Pham | G06F 21/32 |
| 10,440,014 | B1 * | 10/2019 | Hoyer | G06F 21/445 |
| 10,489,785 | B1 * | 11/2019 | Burks | G07D 11/00 |
| 10,630,648 | B1 * | 4/2020 | Borunda | H04L 9/3213 |

(Continued)

FOREIGN PATENT DOCUMENTS

| | | |
|---|---|---|
| JP | 2007-514332 A | 5/2007 |
| JP | 2007-241501 A | 9/2007 |

(Continued)

OTHER PUBLICATIONS

International Search Report for PCT Application No. PCT/JP2022/012741, mailed on May 31, 2022.

(Continued)

*Primary Examiner* — Aravind K Moorthy

(57) ABSTRACT

An information processing apparatus (101) includes an acquisition unit (103) and a notification unit (**104*b*). The acquisition unit (103) acquires an authentication request including biological information of a target person PT for authentication from a first terminal (102) utilized by a desiring person PW different from the target person PT. The notification unit (104*b*) authenticates the target person PT by using the biological information, and also notifies the first terminal (102**) of a result of the authentication.

14 Claims, 35 Drawing Sheets

(56) References Cited

U.S. PATENT DOCUMENTS

| | | | | |
|---|---|---|---|---|
| 10,885,525 | B1 * | 1/2021 | Sharafi | G06Q 20/3674 |
| 11,048,794 | B1 * | 6/2021 | Bordow | H04L 63/102 |
| 11,093,207 | B1 * | 8/2021 | Lovelock | H04M 1/72454 |
| 11,200,306 | B1 * | 12/2021 | Singh | G06F 21/32 |
| 11,327,936 | B1 * | 5/2022 | Kedikian | G06F 16/22 |
| 11,537,700 | B1 * | 12/2022 | Valkaitis | H04L 9/0825 |
| 12,259,962 | B1 * | 3/2025 | Warnick | G06F 21/45 |
| 12,468,792 | B2 * | 11/2025 | Goldstein | G06F 16/636 |
| 2001/0044900 | A1 * | 11/2001 | Uchida | G06F 21/32 713/186 |
| 2002/0021001 | A1 * | 2/2002 | Stratford | G06Q 20/40145 283/74 |
| 2002/0026574 | A1 * | 2/2002 | Watanabe | H04L 9/3268 380/278 |
| 2002/0046336 | A1 * | 4/2002 | Kon | G06F 21/32 713/169 |
| 2003/0154382 | A1 * | 8/2003 | Vicard | G07C 9/257 713/186 |
| 2003/0200257 | A1 * | 10/2003 | Milgramm | H04L 63/0861 709/203 |
| 2004/0083371 | A1 * | 4/2004 | Algazi | G07C 9/257 713/186 |
| 2006/0129840 | A1 * | 6/2006 | Milgramm | H04L 63/0861 713/186 |
| 2006/0282680 | A1 * | 12/2006 | Kuhlman | G06F 21/32 713/186 |
| 2008/0256613 | A1 * | 10/2008 | Grover | G10L 17/00 704/235 |
| 2008/0302870 | A1 * | 12/2008 | Berini | G07C 9/257 235/380 |
| 2008/0307488 | A1 * | 12/2008 | Hammond, II | H04L 67/1093 726/1 |
| 2010/0117791 | A1 * | 5/2010 | Inoue | G06F 21/32 340/5.52 |
| 2011/0035788 | A1 * | 2/2011 | White | G06F 21/577 726/4 |
| 2011/0178931 | A1 * | 7/2011 | Kia | G16H 10/60 705/50 |
| 2011/0231911 | A1 * | 9/2011 | White | G06F 21/32 726/7 |
| 2012/0036041 | A1 * | 2/2012 | Hesselink | G06Q 30/0607 705/26.25 |
| 2012/0084078 | A1 * | 4/2012 | Moganti | G10L 17/00 704/201 |
| 2012/0117633 | A1 * | 5/2012 | Chakra | H04L 63/0861 726/7 |
| 2013/0227651 | A1 * | 8/2013 | Schultz | G06F 21/32 726/4 |
| 2014/0075570 | A1 * | 3/2014 | Hsu | G06F 21/32 726/28 |
| 2014/0314283 | A1 * | 10/2014 | Harding | G06V 40/70 382/115 |
| 2015/0058215 | A1 * | 2/2015 | Johnson | G06Q 20/1085 705/43 |
| 2015/0200935 | A1 * | 7/2015 | Ikeda | H04L 63/0861 726/7 |
| 2016/0019548 | A1 * | 1/2016 | Gangi | G06F 21/34 705/72 |
| 2016/0226868 | A1 * | 8/2016 | Harding | G06F 21/32 |
| 2016/0253675 | A1 * | 9/2016 | Remillet | G06T 7/579 705/44 |
| 2017/0092109 | A1 * | 3/2017 | Trundle | G05D 1/104 |
| 2017/0109742 | A1 * | 4/2017 | Varadarajan | H04L 63/0861 |
| 2017/0169205 | A1 | 6/2017 | Calo et al. | |
| 2017/0171195 | A1 * | 6/2017 | Chang | H04L 63/0861 |
| 2017/0171727 | A1 * | 6/2017 | DeLoy | G06F 3/0346 |
| 2017/0249433 | A1 * | 8/2017 | Hagen | G16H 10/60 |
| 2017/0255942 | A1 * | 9/2017 | Chandrasekaran | G06F 21/32 |
| 2017/0295174 | A1 * | 10/2017 | Kim | G06F 21/32 |
| 2017/0302455 | A1 * | 10/2017 | Abt, Jr. | H04L 63/0823 |
| 2017/0372056 | A1 * | 12/2017 | Narasimhan | G06F 21/32 |
| 2017/0374065 | A1 * | 12/2017 | Shtraym | G06F 21/32 |
| 2018/0007060 | A1 * | 1/2018 | Leblang | H04L 63/107 |
| 2018/0053190 | A1 * | 2/2018 | Gurunathan | H04N 23/45 |
| 2018/0109521 | A1 * | 4/2018 | Kim | H04L 63/0869 |
| 2018/0189715 | A1 * | 7/2018 | Harney | G06Q 10/083 |
| 2018/0197263 | A1 * | 7/2018 | Pearson | G06Q 10/00 |
| 2018/0212961 | A1 * | 7/2018 | Ozaki | G06V 40/172 |
| 2018/0295129 | A1 * | 10/2018 | Kohli | G06F 21/33 |
| 2018/0365467 | A1 * | 12/2018 | Robison | G06V 40/1365 |
| 2019/0042719 | A1 * | 2/2019 | Miu | H04L 63/0861 |
| 2019/0042720 | A1 * | 2/2019 | Delts | G06F 21/44 |
| 2019/0117091 | A1 * | 4/2019 | Reunamaki | A61B 5/01 |
| 2019/0172167 | A1 * | 6/2019 | Scholl | G06Q 50/26 |
| 2019/0222571 | A1 * | 7/2019 | Fausak | G06F 13/385 |
| 2019/0303558 | A1 * | 10/2019 | Kurian | G06V 40/50 |
| 2019/0332753 | A1 * | 10/2019 | Lewis | G06F 21/34 |
| 2019/0372969 | A1 * | 12/2019 | Chang | G06V 40/18 |
| 2020/0004939 | A1 * | 1/2020 | Streit | G06F 21/316 |
| 2020/0026834 | A1 * | 1/2020 | Vimadalal | H04L 9/0825 |
| 2020/0074059 | A1 * | 3/2020 | Beckett, Jr. | G06F 21/36 |
| 2020/0111548 | A1 * | 4/2020 | Ford | G16H 10/60 |
| 2020/0169387 | A1 * | 5/2020 | Wei | G06F 21/6272 |
| 2020/0186522 | A1 * | 6/2020 | Apturkar | H04L 9/3231 |
| 2020/0211305 | A1 * | 7/2020 | Bender | G06N 5/02 |
| 2020/0244650 | A1 * | 7/2020 | Burris | G10L 17/24 |
| 2020/0274705 | A1 * | 8/2020 | Robison | H04L 63/0428 |
| 2020/0280539 | A1 * | 9/2020 | Jebasingh | H04L 63/0254 |
| 2020/0389451 | A1 * | 12/2020 | Nair | H04L 63/0861 |
| 2021/0029107 | A1 * | 1/2021 | Parkinson | H04L 9/3213 |
| 2021/0044429 | A1 * | 2/2021 | Yang | H04L 63/0823 |
| 2021/0142294 | A1 * | 5/2021 | Anhalt | G06F 16/90335 |
| 2021/0150469 | A1 * | 5/2021 | Miller | G06Q 10/0833 |
| 2021/0192032 | A1 * | 6/2021 | Seroussi | G06N 3/044 |
| 2021/0200846 | A1 * | 7/2021 | Yoo | G06V 40/70 |
| 2021/0224373 | A1 | 7/2021 | Haraguchi et al. | |
| 2021/0271227 | A1 * | 9/2021 | Hall | G06Q 10/0833 |
| 2021/0357897 | A1 * | 11/2021 | Phillips | G06K 7/1417 |
| 2021/0365932 | A1 * | 11/2021 | Chalikwar | G06Q 20/3674 |
| 2021/0390962 | A1 * | 12/2021 | Berkeland | G10L 17/24 |
| 2022/0038845 | A1 * | 2/2022 | Daniali | G06V 20/20 |
| 2022/0131698 | A1 * | 4/2022 | Badrinarayanan | H04L 9/3255 |
| 2022/0182371 | A1 * | 6/2022 | Fredrickson | H04L 63/0807 |
| 2022/0335143 | A1 * | 10/2022 | Sarreshteh | G06F 21/6245 |
| 2022/0374506 | A1 * | 11/2022 | Arai | G06F 21/32 |
| 2022/0417249 | A1 * | 12/2022 | Klapman | G06V 40/13 |
| 2023/0008331 | A1 * | 1/2023 | Gupta | H04L 63/0861 |
| 2023/0061617 | A1 * | 3/2023 | Fainstein | G06F 21/32 |
| 2023/0063632 | A1 * | 3/2023 | Robinson-Morgan | G06F 21/6209 |
| 2023/0082094 | A1 * | 3/2023 | Keret | G06F 21/32 726/2 |
| 2023/0153743 | A1 * | 5/2023 | Kaneria | G06Q 10/0832 705/332 |
| 2023/0197257 | A1 | 6/2023 | Notomi | |
| 2023/0216693 | A1 * | 7/2023 | Singh | H04L 9/30 713/176 |
| 2023/0325484 | A1 * | 10/2023 | Bart | G06V 10/761 713/186 |
| 2023/0421560 | A1 * | 12/2023 | Mizuta | H04L 63/0823 |
| 2024/0087362 | A1 * | 3/2024 | Macciola | G06V 40/172 |
| 2024/0152590 | A1 * | 5/2024 | Okumura | G06Q 10/10 |
| 2024/0203145 | A1 * | 6/2024 | Hsu | G06V 10/56 |
| 2024/0232308 | A1 * | 7/2024 | Beaver | G10L 17/04 |
| 2024/0331443 | A1 * | 10/2024 | Zeng | G06V 40/172 |
| 2024/0378318 | A1 * | 11/2024 | Dange | H04L 9/3247 |
| 2024/0388892 | A1 * | 11/2024 | Zhang | H04W 8/08 |
| 2024/0394264 | A1 * | 11/2024 | Jackson | G06F 16/252 |
| 2024/0403402 | A1 * | 12/2024 | Haller | G06F 21/32 |
| 2024/0425057 | A1 * | 12/2024 | Maxi | H04W 4/40 |
| 2024/0430076 | A1 * | 12/2024 | Yoshida | H04N 1/442 |
| 2025/0077641 | A1 * | 3/2025 | Mizusaki | G06F 21/445 |
| 2025/0274449 | A1 * | 8/2025 | Holl | H04L 63/0861 |
| 2025/0301321 | A1 * | 9/2025 | Anumala | H04W 12/06 |
| 2025/0337741 | A1 * | 10/2025 | Kollarapu | H04L 63/06 |
| 2026/0003944 | A1 * | 1/2026 | Dokken | G06F 21/32 |

FOREIGN PATENT DOCUMENTS

| | | |
|---|---|---|
| JP | 2016-058038 A | 4/2016 |
| JP | 2017-058924 A | 3/2017 |

(56) References Cited

FOREIGN PATENT DOCUMENTS

| | | | |
|---|---|---|---|
| JP | 2021-114196 | A | 8/2021 |
| JP | 2021-117681 | A | 8/2021 |
| WO | 2021/240580 | A1 | 12/2021 |

OTHER PUBLICATIONS

JP Office Action for JP Application No. 2024-507443, mailed on Sep. 30, 2025 with English Translation.

* cited by examiner

FIG. 10A
FIG. 10B
LEGITIMATE PERSON BELONGING TO OO.
THERE IS POSSIBILITY OF IMPERSONATION.
PLEASE CONTACT TELEPHONE NUMBER: OOOO-XXXX.

FIG. 13

211a

| MASTER INFORMATION | | | |
|---|---|---|---|
| REGISTRANT ID | MASTER BIOLOGICAL INFORMATION | ATTRIBUTE INFORMATION | SECOND TERMINAL INFORMATION |

FIG. 22

314a

| CONDITION INFORMATION | |
|---|---|
| REGISTRANT ID | PRESENCE OR ABSENCE OF COMPREHENSIVE AGREEMENT |

INFORMATION PROCESSING APPARATUS, INFORMATION PROCESSING SYSTEM, INFORMATION PROCESSING METHOD, AND STORAGE MEDIUM

This application is a National Stage Entry of PCT/JP2022/012741 filed on Mar. 18, 2022, the contents of all of which are incorporated herein by reference, in their entirety.

TECHNICAL FIELD

The present invention relates to an information processing apparatus, an information processing system, an information processing method, and a storage medium.

BACKGROUND ART

Patent Document 1 describes a technique intended in such a way that presence or absence of a qualification of a home-visit care worker can be confirmed in home-visit care. An information processing apparatus described in Patent Document 1 includes an acquisition unit that acquires biological information of a visiting care giver, a determination unit that reads a qualification of the acquired relevant care giver from a qualification holder database that stores biological information and a qualification in association with each other, and determines whether the qualification satisfies a criterion, and a storage processing unit that stores a result of the determination in a management information database.

Patent Documents 2 and 3 describes a technique for authenticating, when a police officer wears a wearable camera, whether the police officer may use the wearable camera, and associating, when the authentication of the police officer has properly ended, the police officer and the wearable camera with each other.

Patent Document 4 describes an information processing apparatus for providing a hint for performing appropriate police questioning. The information processing apparatus of Patent Document 4 records, as question data, image information of a questioning target person and audio information acquired when a questioner asks a question, in association with a feature value extracted from the image information of the questioning target person.

RELATED DOCUMENT

Patent Document

Patent Document 1: International Patent Publication No. WO2021/240580

Patent Document 2: Japanese Patent Application Publication No. 2021-114196

Patent Document 3: Japanese Patent Application Publication No. 2016-058038

Patent Document 4: Japanese Patent Application Publication No. 2017-058924

DISCLOSURE OF THE INVENTION

Technical Problem

In general, a crime, a fraud, and the like by a person impersonating a service provider such as a police officer, a taxi driver, or a home-visit care giver have become a social problem. By authenticating a service provider when a service recipient receives, for example, provision of a service, suppression of a crime, a fraud, or the like by impersonation can be made. Herein, authentication means confirmation that a target person such as a service provider is a legitimate person registered with a predetermined organization, a company, or the like.

However, with the techniques described in Patent Documents 1 to 4, it is difficult for a service recipient to acquire a result of authenticating a home-visit care giver, a police officer, or the like as necessary.

In view of the problem described above, one example of an object of the present invention is to provide an information processing apparatus, an information processing system, an information processing method, and a storage medium that solve a matter that it is difficult for a desiring person to acquire a result of authenticating a target person as necessary.

Solution to Problem

According to one aspect of the present invention, there is provided an information processing apparatus including:

- an acquisition unit that acquires an authentication request including biological information of a target person for authentication from a first terminal utilized by a desiring person different from the target person; and
- a notification unit that notifies the first terminal of a result of authenticating the target person by using the biological information.

According to one aspect of the present invention, there is provided an information processing system including:

- the information processing apparatus described above; and
- the first terminal, wherein
- the first terminal includes
- a request unit that acquires biological information of the target person, and transmits the authentication request including the acquired biological information to the information processing apparatus, and
- a display unit that acquires a result of authenticating the target person from the information processing apparatus, and displays the acquired result.

According to one aspect of the present invention, there is provided an information processing method including, by a computer:

- acquiring an authentication request including biological information of a target person for authentication from a first terminal utilized by a desiring person different from the target person; and
- notifying the first terminal of a result of authenticating the target person by using the biological information.

According to one aspect of the present invention, there is provided a storage medium storing a program for causing a computer to execute:

- acquiring an authentication request including biological information of a target person for authentication from a first terminal utilized by a desiring person different from the target person; and
- notifying the first terminal of a result of authenticating the target person by using the biological information.

Advantageous Effects of Invention

According to the present invention, it becomes possible for a desiring person to acquire a result of authenticating a target person as necessary.

BRIEF DESCRIPTION OF THE DRAWINGS

FIGS. 10A and B are diagrams illustrating display examples of results of authentication, in which FIG. 10A illustrates a display example of a result of authentication when authentication has succeeded.

FIG. 13 is diagram illustrating one example of a configuration of master information according to the second example embodiment.

FIG. 22 is a diagram illustrating one example of a configuration of condition information according to the third example embodiment.

EXAMPLE EMBODIMENT

Hereinafter, example embodiments of the present invention are described by using the drawings. Note that, a similar reference sign is assigned to a similar component in all the drawings, and description is omitted as appropriate.

First Example Embodiment (Outline)

Figure 1:
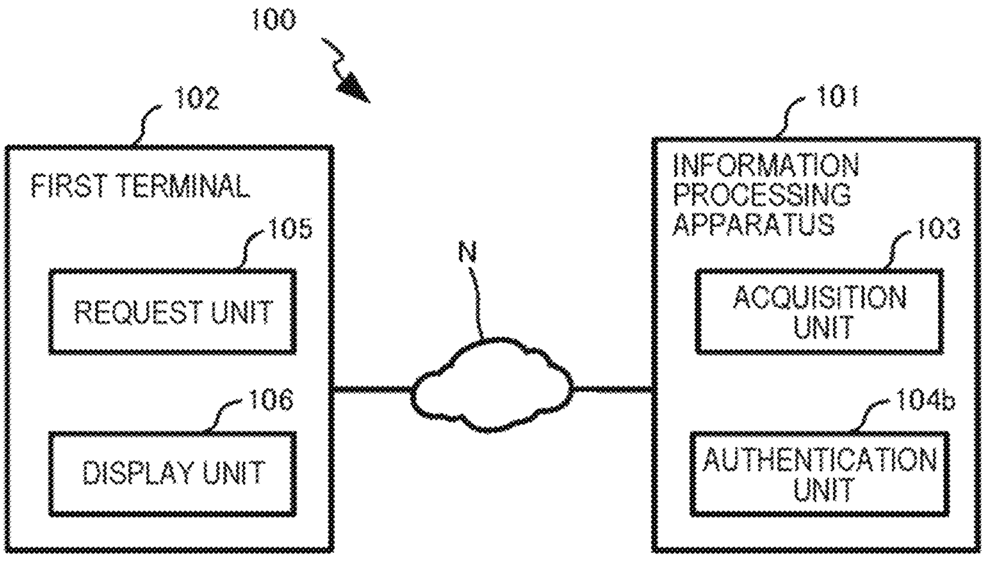
FIG. 1 is a diagram illustrating an example of an outline of an information processing system according to a first example embodiment of the present invention.

FIG. 1 is a diagram illustrating an example of an outline of an information processing system 100 according to the first example embodiment of the present invention. The information processing system 100 according to the first example embodiment includes an information processing apparatus 101 and a first terminal 102.

The information processing apparatus 101 includes an acquisition unit 103 and a notification unit 104*b*. The acquisition unit 103 acquires an authentication request including biological information of a target person PT for authentication from the first terminal 102 utilized by a desiring person PW different from the target person PT. The notification unit 104*b* notifies the first terminal 102 of a result of authenticating the target person PT by using the biological information.

The first terminal 102 includes a request unit 105 and a display unit 106. The request unit 105 acquires biological information of the target person PT, and transmits the authentication request including the acquired biological information to the information processing apparatus 101. The display unit 106 acquires a result of authentication from the information processing apparatus 101 and displays the result.

According to the information processing system 100, it becomes possible for the desiring person PW to acquire a result of authenticating the target person PT as necessary. According to the information processing apparatus 101, it becomes possible for the desiring person PW to acquire a result of authenticating the target person PT as necessary.

Figure 2:
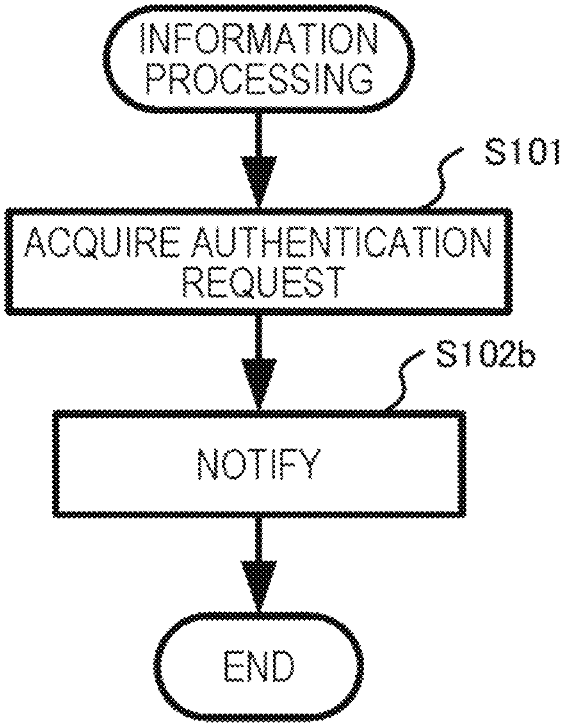
FIG. 2 is a flowchart illustrating an example of an outline of information processing according to the first example embodiment of the present invention.

FIG. 2 is a flowchart illustrating an example of an outline of information processing according to the first example embodiment of the present invention.

The acquisition unit 103 acquires an authentication request including biological information of the target person PT for authentication from the first terminal 102 utilized by the desiring person PW different from the target person PT (step S101).

The notification unit 104*b* authenticates the target person PT by using the biological information, and notifies the first terminal 102 of a result of authentication (step S102*b*), and ends the information processing.

According to the information processing, it becomes possible for the desiring person PW to acquire a result of authenticating the target person PT as necessary.

Details

The information processing system 100 is a system for authenticating the target person PT in response to a request from the desiring person PW. The target person PT is, for example, a service provider such as a police officer, a taxi driver, or a home-visit care giver. The desiring person PW is, for example, a service recipient who receives provision of a service from a police officer, a taxi driver, a home-visit care giver, or the like. Authentication means confirmation that the target person PT is a legitimate person registered with a predetermined organization, a company, or the like.

The information processing system 100 includes the information processing apparatus 101 and the first terminal 102 that are connected to each other via a network N. The information processing apparatus 101 and the first terminal 102 can transmit and receive data to and from each other via the network N. The network N is a communication network configured in a wired or wireless manner, or by a combination thereof.

(Detailed Configuration Example of the Information Processing Apparatus 101)

Figure 3:
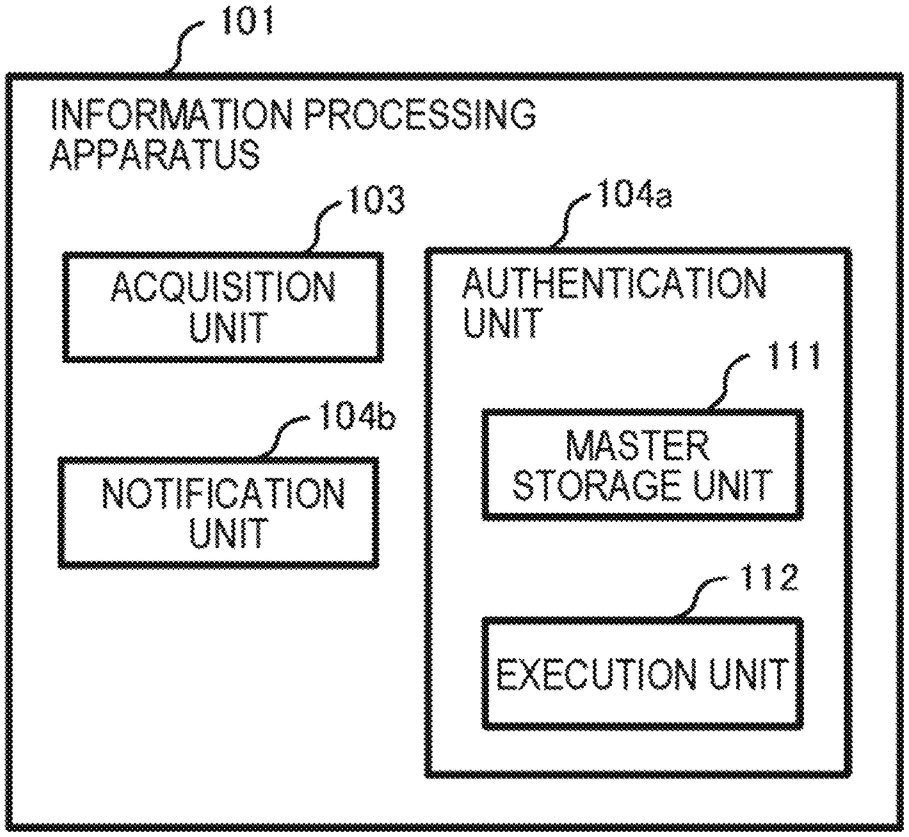
FIG. 3 is a diagram illustrating a detailed example of a functional configuration of an information processing apparatus according to the first example embodiment.

FIG. 3 is a diagram illustrating a detailed example of a functional configuration of the information processing apparatus 101 according to the first example embodiment. The information processing apparatus 101 includes the acquisition unit 103, an authentication unit 104*a*, and the notification unit 104*b*. The authentication unit 104*a* includes a master storage unit 111 and an execution unit 112.

The authentication unit 104*a* authenticates the target person PT by using biological information of the target person PT acquired by the acquisition unit 103 and master biological information registered in the master information 111*a*.

The master storage unit 111 is a storage unit for storing the master information 111*a*. The master information 111*a* is information relating to a registrant. The master information 111*a* is previously registered in the master storage unit 111.

Figure 4:
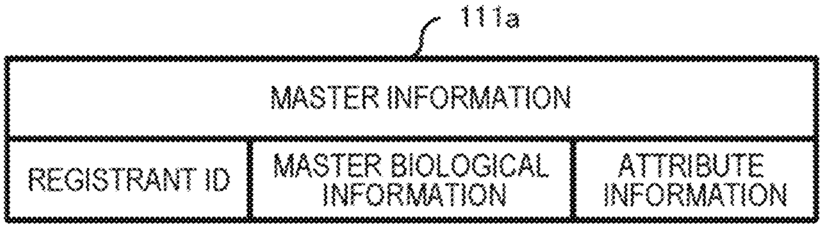
FIG. 4 is a diagram illustrating one example of a configuration of master information according to the first example embodiment.

FIG. 4 is a diagram illustrating one example of a configuration of the master information 111*a* according to the first example embodiment. The master information 111*a* associates a registrant identifier (ID), master biological information, and attribute information of a common registrant.

The registrant ID is personal identification information for identifying a registrant. Personal identification information is information for identifying an individual.

The master biological information is biological information of the registrant. Biological information according to the present example embodiment includes a face image. Note that, the biological information is not limited to a face image, and may include one or a plurality of a face image, a fingerprint, an iris, a vein, and the like.

Attribute information is information indicating an attribute of the registrant.

For example, when a registrant is a police officer, attribute information includes at least one of a name, belonging, a rank, and the like. For example, when a registrant is a care giver, attribute information includes at least one of a name, an employee number, content of qualification, and the like. For example, when a registrant is a driver of a taxi, attribute information includes at least one of a name, a vehicle number, and the like.

FIG. 3 is referred to again.

The execution unit 112 authenticates the target person PT, based on whether the target person PT is a registrant previously registered in the master information 111*a*.

Specifically, when the master information 111*a* includes biological information of the target person PT acquired by the acquisition unit 103, the target person PT is a registrant. In this case, the execution unit 112 determines that authentication of the target person PT has succeeded. When the master information 111*a* does not include the biological information of the target person PT acquired by the acquisition unit 103, the target person PT is not a registrant. In this case, the execution unit 112 determines that authentication of the target person PT has failed.

The notification unit 104*b* notifies the first terminal 102 of a result of authentication by the authentication unit 104*a*. Specifically, the notification unit 104*b* notifies the first terminal 102 of a result of determination including either success or failure of authentication. Note that, a result of authentication of which the first terminal 102 is notified may include at least one of success and failure of authentication.

(Detailed Configuration Example of the Request Unit 105)

Specifically, when a request of the desiring person PW is accepted, the request unit 105 generates biological information of the target person PT by itself, generates an authentication request including the generated biological information, and transmits the generated an authentication request to the information processing apparatus 101. Biological information included in the authentication request may be biological information being relevant to the master biological information, and, in the present example embodiment, is a face image as described above.

Figure 5:
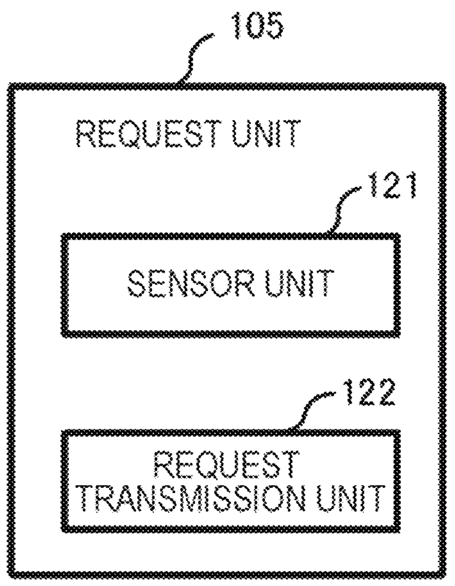
FIG. 5 is a diagram illustrating a detailed example of a functional configuration of a request unit according to the first example embodiment.

FIG. 5 is a diagram illustrating a detailed example of a functional configuration of the request unit 105 according to the first example embodiment. The request unit 105 includes a sensor unit 121 and a request transmission unit 122.

When a request of the desiring person PW is accepted, the sensor unit 121 generates biological information of the target person PT. The sensor unit 121 is configured in such a way as to include a sensor for generating biological information. In the present example embodiment, the sensor unit 121 is configured in such a way as to include, for example, a camera.

The request transmission unit 122 generates an authentication request including biological information generated by the sensor unit 121, and transmits the generated authentication request to the information processing apparatus 101.

So far, the functional configuration example of the information processing system 100 according to the first example embodiment of the present invention has been mainly described. From here, a physical configuration example of the information processing system 100 according to the first example embodiment is described.

(Physical Configuration of the Information Processing System 100)

The information processing system 100 is physically constituted of the information processing apparatus 101 and the first terminal 102 that are connected via a network N. Each of the information processing apparatus 101 and the first terminal 102 is constituted of a physically different single apparatus. Note that, one or both of the information processing apparatus 101 and the first terminal 102 may be constituted of a plurality of apparatuses physically connected via a line such as the network N.

(Physical Configuration of the Information Processing Apparatus 101)

The information processing apparatus 101 is typically a general-purpose computer. The information processing apparatus 101 may be a tablet personal computer (PC), a smartphone, or the like.

Figure 6:
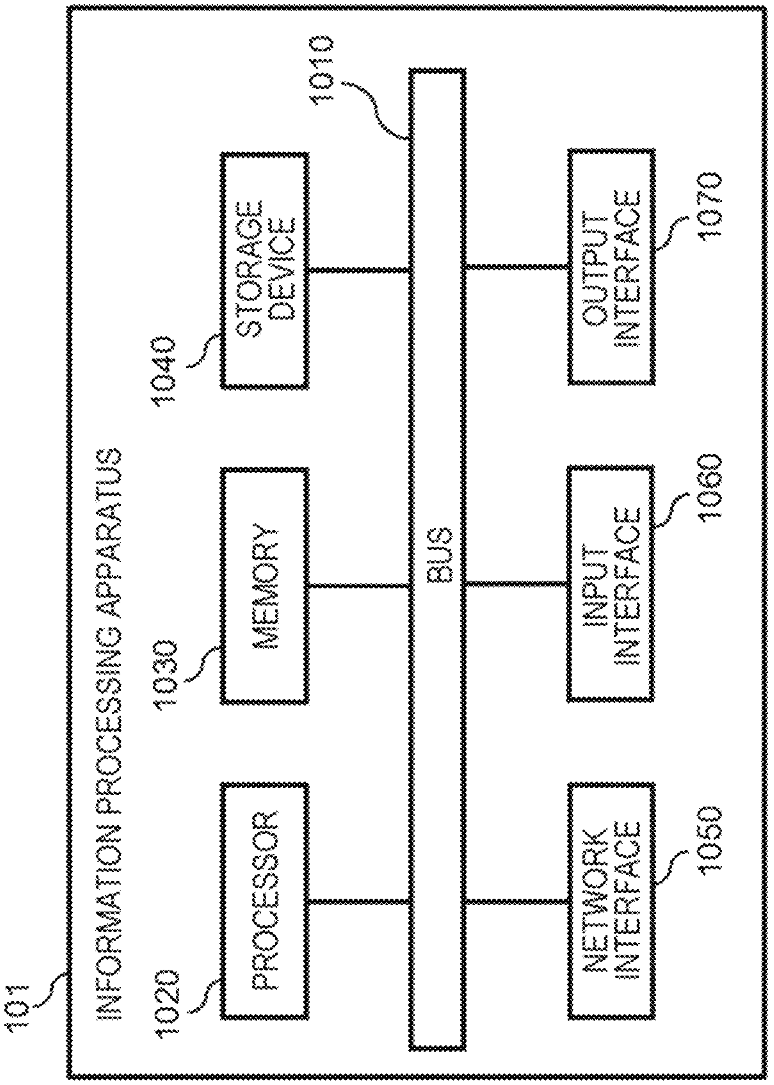
FIG. 6 is a diagram illustrating a physical configuration example of an information processing apparatus according to the first example embodiment of the present invention.

Specifically, for example, the information processing apparatus 101 physically includes a bus 1010, a processor 1020, a memory 1030, a storage device 1040, a network interface 1050, an input interface 1060, and an output interface 1070, as illustrated in FIG. 6.

The bus 1010 is a data transmission path through which the processor 1020, the memory 1030, the storage device 1040, the network interface 1050, the input interface 1060, and the output interface 1070 transmit and receive data to and from each other. However, a method of connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like.

The storage device 1040 of the information processing apparatus 101 stores a program module for achieving a function of the information processing apparatus 101. The processor 1020 reads each of the program modules onto the memory 1030, executes the read program module, and thereby achieves a function being relevant to the program module.

The network interface 1050 is an interface for connecting the information processing apparatus 101 to the network N.

The input interface 1060 is an interface for a user to input information, and includes, for example, one or a plurality of a touch panel, a keyboard, a mouse, and the like.

The output interface 1070 is an interface for presenting information to a user, and includes, for example, one or a plurality of a liquid crystal panel, an organic electro-luminescence (EL) panel, and the like.

(Physical Configuration of the First Terminal 102)

The first terminal 102 is typically a tablet personal computer (PC), a smartphone, or the like. The first terminal 102 may be a general-purpose computer.

Figure 7:
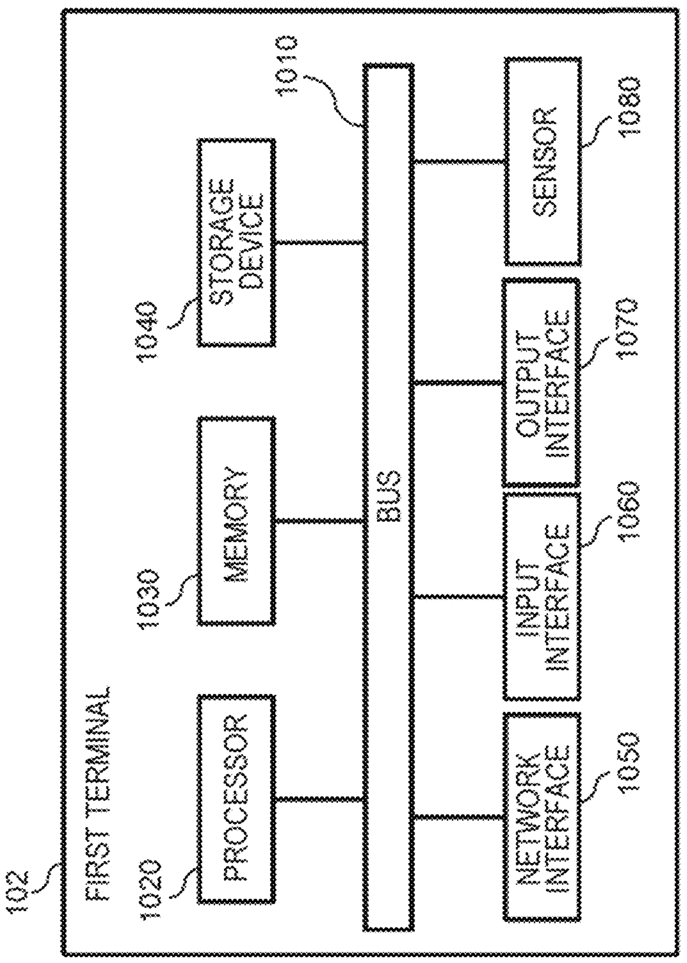
FIG. 7 is a diagram illustrating a physical configuration example of a first terminal according to the first example embodiment of the present invention.

Specifically, for example, the first terminal 102 physically includes a bus 1010, a processor 1020, a memory 1030, a storage device 1040, a network interface 1050, an input interface 1060, and an output interface 1070 that are similar to those of the information processing apparatus 101, as illustrated in FIG. 7. The first terminal 102 further includes a sensor 1080.

The bus 1010 of the first terminal 102 is a data transmission path through which the processor 1020, the memory 1030, the storage device 1040, the network interface 1050, the input interface 1060, the output interface 1070, and the sensor 1080 transmit and receive data to and from each other.

The storage device 1040 of the first terminal 102 stores a program module for achieving a function of the first terminal 102. The network interface 1050 of the first terminal 102 is an interface for connecting the first terminal 102 to the network N.

The sensor 1080 is a sensor for generating biological information, and is, for example, a camera in the present example embodiment.

So far, the physical configuration example of the information processing system 100 according to the first example embodiment of the present invention has been mainly described. From here, an operation example of the information processing system 100 according to the first example embodiment is described.

(Operation of the Information Processing System 100)

Figure 8:
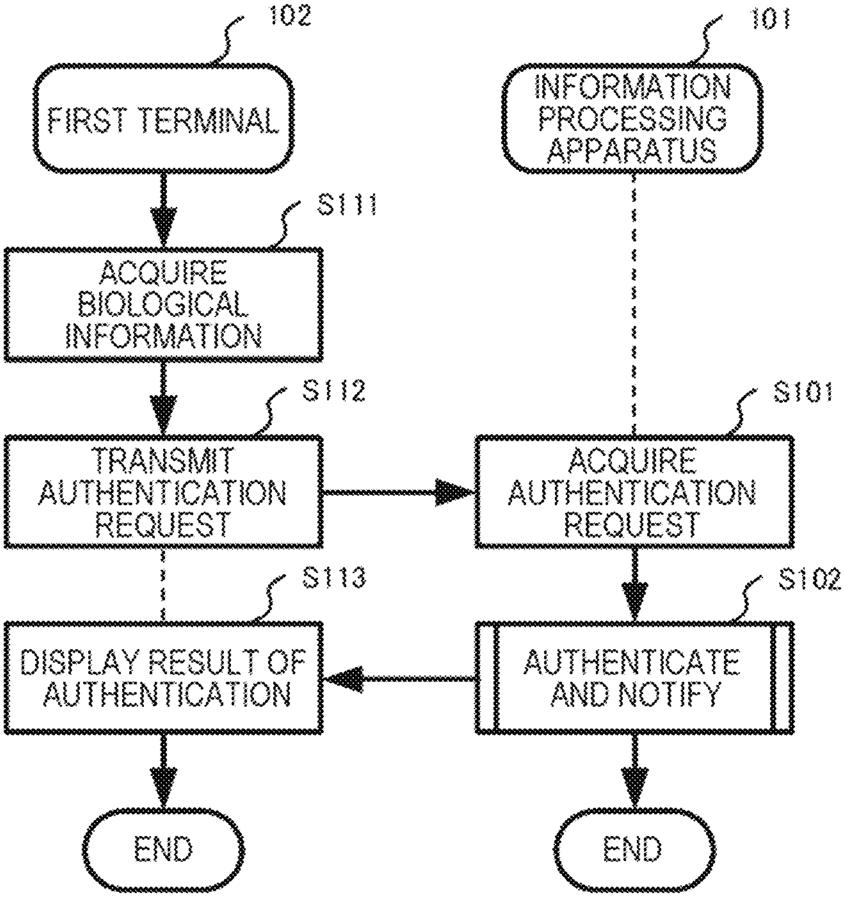
FIG. 8 is a diagram illustrating an example of a detailed flow of information processing according to the first example embodiment.

FIG. 8 is a diagram illustrating an example of a detailed flow of information processing (information processing method) according to the first example embodiment of the present invention. The information processing is processing for authenticating the target person PT in response to a request from the desiring person PW, and notifying of a result thereof. The information processing includes first processing executed by the first terminal 102, and second processing executed by the information processing apparatus 101. In FIG. 8, examples of the first processing and the second processing are illustrated together in one figure. When, for example, a request of the desiring person PW is accepted, the first terminal 102 starts information processing. The information processing is described by using an example in which biological information includes face information.

For example, when receiving provision of a service from the target person PT, the desiring person PW directs the sensor unit 121 toward the target person PT in such a way as to capture a face of the target person PT, and gives an instruction of capture to the first terminal 102. The instruction of capture herein is equivalent to a request of the desiring person PW.

The sensor unit 121 generates biological information of the target person PT (step S111).

Specifically, for example, the sensor unit 121 captures the target person PT, and generates biological information including a face image of the target person PT acquired according to the capturing.

The request transmission unit 122 generates an authentication request including the biological information generated in step S111, and transmits the generated authentication request to the information processing apparatus 101 (step S112).

Specifically, for example, the request transmission unit 122 acquires the biological information generated in step S111 from the sensor unit 121. The request transmission unit 122 generates an authentication request including the acquired biological information. The request transmission unit 122 transmits the generated authentication request to the information processing apparatus 101 via the network N.

The acquisition unit 103 acquires the authentication request transmitted in step S112, from the first terminal 102 via the network N (step S101).

The authentication unit 104*a* and the notification unit 104*b* authenticate the target person PT by using the biological information of the target person PT included in the authentication request acquired in step S101, and notify the first terminal 102 of a result of the authentication (step S102).

Figure 9:
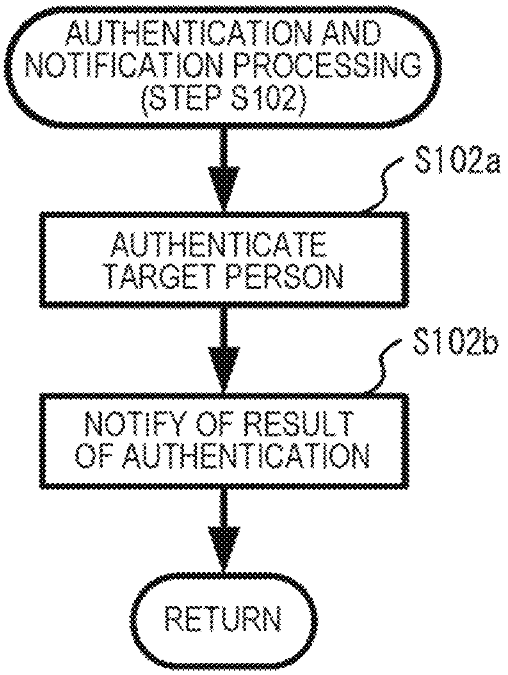
FIG. 9 is a flowchart illustrating a detailed example of authentication processing according to the first example embodiment.

FIG. 9 is a flowchart illustrating a detailed example of authentication and notification processing (step S102) according to the first example embodiment.

The execution unit 112 authenticates the target person PT by using the biological information of the target person PT included in the authentication request acquired in step S101 and the master biological information registered in the master information 111*a* (step S102*a*).

Specifically, for example, when the biological information of the target person PT is included in the master information 111*a*, the execution unit 112 determines that authentication of the target person PT has succeeded. Moreover, when the biological information of the target person PT is not included in the master information 111*a*, the execution unit 112 determines that authentication of the target person PT has failed.

More specifically, the execution unit 112 determines whether each of pieces of master biological information of all registrants included in the master information 111*a* matches the biological information of the target person PT. Matching means substantially matching, and includes not only a case of completely matching but also a case of differing within a previously determined range.

Herein, the execution unit 112 may use a known method such as pattern matching or a method of comparing image feature values in order to determine whether the master biological information and the biological information of the target person PT match. When image feature values are compared, the master biological information may include an image feature value.

When the master information 111*a* includes master biological information that matches the biological information of the target person PT, the execution unit 112 determines that authentication of the target person PT has succeeded. On the other hand, when the master information 111*a* does not include master biological information that matches the biological information of the target person PT, the execution unit 112 determines that authentication of the target person PT has failed.

The notification unit 104*b* notifies the first terminal 102 of a result of authentication in step S102*a* via the network N (step S102*b*), and ends the information processing (see FIG. 8).

Specifically, for example, when it is determined in step S102*a* that authentication of the target person PT has succeeded, the notification unit 104*b* generates a result of authentication indicating that the authentication of the target person PT has succeeded. In this instance, the notification unit 104*b* may generate a result of authentication that further includes attribute information related to the master biological information matching the biological information of the target person PT. When attribute information is included in a result of authentication, the attribute information included in the result of authentication may be all or a part of information included in the attribute information of the master information 111*a*.

Moreover, when it is determined in step S102*a* that authentication of the target person PT has failed, the notification unit 104*b* generates a result of authentication indicating that the authentication of the target person PT has failed, and notifies the first terminal 102 of the generated result of authentication. In this instance, the notification unit 104*b* may generate a result of authentication that further includes contact information (e.g., a telephone number) of a predetermined organization, a company, or the like that has performed authentication of the target person PT.

Then, the notification unit 104*b* notifies the first terminal 102 of the generated result of authentication.

FIG. 8 is referred to again.

When the result of authentication notified of in step S102*b* is acquired via the network N, the display unit 106 displays the acquired result of the authentication (step S113), and ends the information processing.

Specifically, for example, when a result of authentication indicates that authentication has succeeded, the display unit 106 performs display indicating that the authentication has succeeded. When a result of authentication indicates that authentication has failed, the display unit 106 displays that the authentication has failed. In this instance, the display unit 106 may display information included in the result of authentication notified of in step S102*b* together with the result of authentication.

Figure 10A:
Figure 10B:
FIG. 10B illustrates a display example of a result of authentication when authentication has failed.

FIGS. 10A and B are diagrams illustrating display examples of results of authentication, in which FIG. 10A illustrates a display example of a result of authentication when authentication has succeeded, and FIG. 10B illustrates a display example of a result of authentication when authentication has failed. FIG. 10A illustrates a display example of a message indicating success of authentication that the target person PT is a legitimate person, and a result of authentication including belonging "○○" being one example of an attribute of the target person PT. FIG. 10 B illustrates a display example of a message indicating failure of authentication that that there is a possibility that the target person PT is impersonation, and a result of authentication including contact information (telephone number) for the predetermined organization, the company, or the like. Note that, a message indicating success or failure of authentication may be variously changed. For example, a message indicating failure of authentication may be such as "No corresponding person. Please contact xxx.".

The desiring person PW can know a result of authentication of the target person PT by viewing display of a result of authentication. Thus, the desiring person PW can know whether the target person PT is a legitimate person registered with a predetermined organization, a company, or the like.

So far, the first example embodiment of the present invention has been described.

According to the present example embodiment, the information processing apparatus 101 includes the acquisition unit 103 and the notification unit 104*b*. The acquisition unit 103 acquires an authentication request including biological information of the target person PT for authentication from the first terminal 102 utilized by the desiring person PW different from the person PT. The notification unit 104*b* notifies the first terminal 102 of a result of authenticating the target person PT by using biological information.

Thereby, the desiring person PW can perform authentication of the target person PT by using the first terminal 102 that he or she utilizes. Therefore, it becomes possible for the desiring person PW to acquire a result of authenticating the target person PT as necessary.

According to the present example embodiment, the information processing system 100 includes the information processing apparatus 101 and the first terminal 102. The first terminal 102 includes the request unit 105 and the display unit 106. The request unit 105 acquires biological information of the target person PT, and transmits an authentication request including the acquired biological information to the information processing apparatus 101. The display unit 106 acquires a result of authentication from the information processing apparatus 101 and displays the result.

Thereby, the desiring person PW can perform authentication of the target person PT by using the first terminal 102 that he or she utilizes. Therefore, it becomes possible for the desiring person PW to acquire a result of authenticating the target person PT as necessary.

According to the present example embodiment, the request unit 105 includes the sensor unit 121 that generates biological information of the target person PT, and the request transmission unit 122 that generates an authentication request including the generated biological information and transmits the generated authentication request to the information processing apparatus 101.

Thereby, the desiring person PW can acquire the biological information of the target person PT by using the first terminal 102 that he or she utilizes, and can know a result of authenticating the target person PT. Therefore, it becomes possible for the desiring person PW to acquire a result of authenticating the target person PT as necessary.

Modified Example 1

In the first example embodiment, an example has been described in which the execution unit 112 notifies the first terminal 102 of a result of authentication in both cases where authentication of the target person PT has succeeded and unsuccessful. However, the execution unit 112 may notify the first terminal 102 of a result of authentication in at least one of a case where authentication of the target person PT has succeeded and a case where authentication of the target person PT has failed.

For example, in a case where only success of authentication is notified of, the display unit 106 may perform display indicating that authentication has failed, when a previously determined time has elapsed but a result of authentication is not notified of. Moreover, for example, in a case where only failure of authentication is notified of, the display unit 106 may perform display indicating that the authentication has succeeded when a previously determined time has elapsed but a result of authentication is not notified of.

The present modified example also provides an advantageous effect similar to that according to the first example embodiment.

Second Example Embodiment

In the information processing system 100 according to the first example embodiment, there is a concern that authentication may be performed for the target person PT at any time.

For example, in a case where authentication of the target person PT is performed when the target person PT is not at work, privacy of the target person PT and the like may be violated. Moreover, for example, in a case where the target person PT is on duty but authentication of the target person PT is performed at such a time that there is no need for the authentication, there is a concern that authentication is performed for a purpose other than an original purpose of confirming legitimacy of the target person PT, smooth work in a predetermined organization, a company, or the like is impeded.

A second example embodiment describes an example of an information processing system and the like for enabling a desiring person PW to authenticate the target person PT as necessary while protecting privacy of the target person PT and smooth prosecution or the like of work in a predetermined organization, a company, and the like. In the present example embodiment, in order to simplify description, description overlapping that in the first example embodiment is omitted as appropriate.

Figure 11:
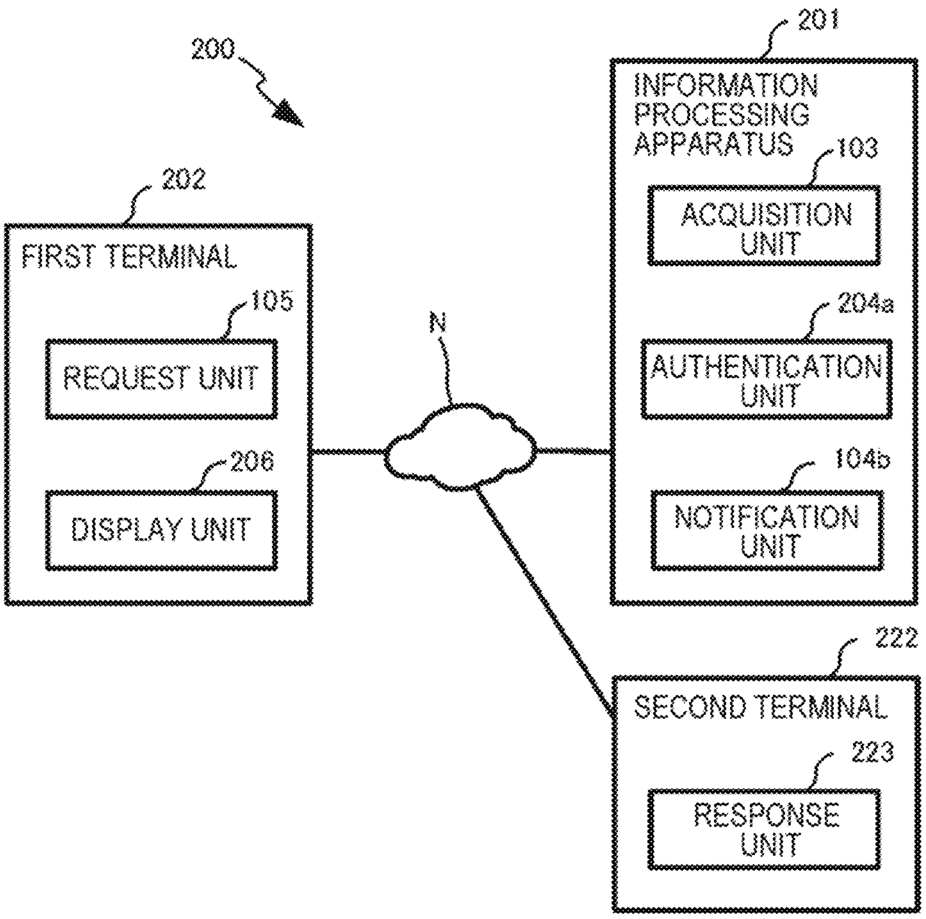
FIG. 11 is a diagram illustrating a configuration example of an information processing system according to a second example embodiment of the present invention.

FIG. 11 is a diagram illustrating a configuration example of an information processing system 200 according to the second example embodiment.

The information processing system 200 includes an information processing apparatus 201, a first terminal 202, and a second terminal 222 utilized by the target person PT that replace the information processing apparatus 101 and the first terminal 102 according to the first example embodiment. The information processing apparatus 201, the first terminal 202, and the second terminal 222 are connected to each other via a network N, and can transmit and receive data to and from each other via the network N.

The information processing apparatus 201 includes an acquisition unit 103 and a notification unit 104*b* similar to those according to the first example embodiment, and an authentication unit 204*a* that replaces the authentication unit 104*a* according to the first example embodiment.

The authentication unit 204*a* authenticates the target person PT by using the biological information of the target person PT acquired by the acquisition unit 103, when a previously determined execution condition is satisfied.

The execution condition is a condition for notifying of a result of authenticating the target person PT.

When the execution condition is not satisfied, the authentication unit 204*a* and the notification unit 104*b* do not execute at least one of the authentication of the target person PT and notification of a result of authentication. When the execution condition is not satisfied, no result of authentication is generated unless the authentication unit 204*a* executes authentication of the target person PT, and, therefore, the notification unit 104*b* can notify no result of authentication. Thus, as a result, the notification unit 104*b* does not notify a result of authentication (see a second modified example).

The present example embodiment is described by using an example in which the notification unit 104*b* does not notify a result of authentication when the execution condition is not satisfied.

Although an execution condition may be determined as appropriate, an execution condition includes an individual agreement condition in the present example embodiment. The individual agreement condition is that there is an agreement of the target person PT to an authentication request from the first terminal 202.

Figure 12:
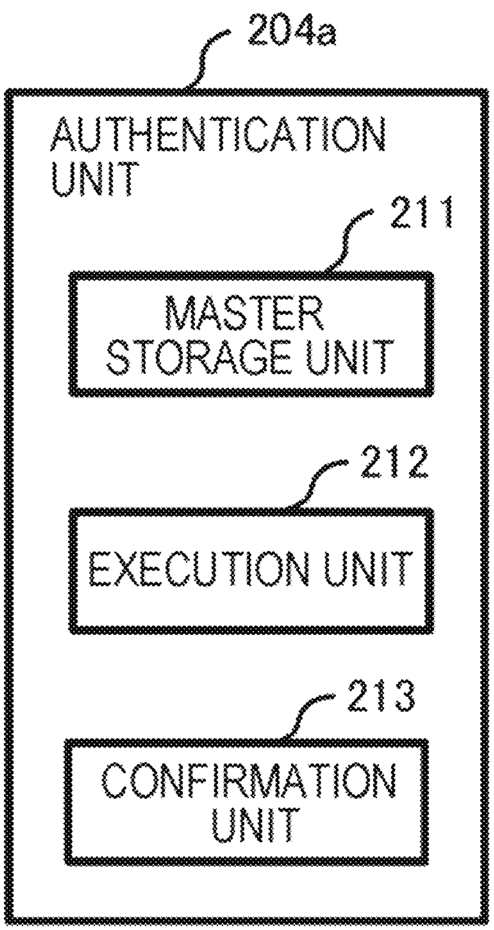
FIG. 12 is diagram illustrating a detailed example of a functional configuration of an authentication unit according to the second example embodiment.

FIG. 12 is a diagram illustrating a detailed example of a functional configuration of the authentication unit 204*a* according to the second example embodiment. The authentication unit 204*a* includes a master storage unit 211 and an execution unit 212 that replace the master storage unit 111 and the execution unit 112 according to the first example embodiment. The authentication unit 204*a* further includes a confirmation unit 213.

The master storage unit 211 is a storage unit for storing master information 211*a* relating to a registrant, similarly to the master storage unit 111 according to the first example embodiment. The master information 211*a* is previously registered in the master storage unit 211.

FIG. 13 is a diagram illustrating one example of a configuration of the master information 211*a* according to the second example embodiment. The master information 211*a* according to the present example embodiment associates a registrant identifier (ID) of a common registrant, master biological information, attribute information, and second terminal information. The registrant ID, the master biological information, and the attribute information are similar to those according to the first example embodiment.

The second terminal information is information relating to the second terminal 222 utilized by the registrant. The second terminal information includes, for example, an address of the second terminal 222 in the network N.

FIG. 12 is referred to again.

When an authentication request is acquired from the first terminal 102, the confirmation unit 213 confirms with the second terminal 222 concerning an agreement of the target person PT to the authentication request. Specifically, when an authentication request is acquired from the first terminal 102, the confirmation unit 213 transmits confirmation of whether to agree to the authentication request, to the second terminal 222 utilized by the target person PT.

When a response indicating an agreement to the authentication request is acquired from the second terminal 222, the execution unit 212 authenticates the target person PT by using biological information of the target person PT acquired by the acquisition unit 103.

FIG. 11 is referred to again.

The first terminal 202 includes a request unit 105 similar to that according to the first example embodiment, and a display unit 206 that replaces the display unit 106 according to the first example embodiment.

When a result of authentication is acquired from the information processing apparatus 101 within a predetermined time after the request unit 105 transmits an authentication request, the display unit 206 displays the acquired result of the authentication, similarly to the display unit 106 according to the first example embodiment. The display unit 206 further displays that authentication has not been performed, when a result of authentication is not acquired from the information processing apparatus 101 even though a predetermined time elapses after the request unit 105 transmits the authentication request.

The second terminal 222 includes a response unit 223. When confirmation of whether to agree to an authentication request is acquired from the confirmation unit 213, the response unit 223 generates a response of whether to agree to the authentication request, according to an instruction of the target person PT, and transmits the generated response to the information processing apparatus 201.

So far, the functional configuration example of the information processing system 200 according to the second example embodiment of the present invention has been mainly described.

The information processing apparatus 201 and the first terminal 202 according to the present example embodiment may be physically configured similarly to the information processing apparatus 101 and the first terminal 102 according to the first example embodiment, respectively. The second terminal 222 may be configured similarly to the first terminal 102 according to the first example embodiment. Note that, the second terminal 222 may not include the sensor 1080.

(Operation of the Information Processing System 200)

From here, an operation example of the information processing system 200 according to the second example embodiment is described. Similarly to the first example embodiment, the information processing system 200 executes information processing for authenticating the target person PT in response to a request from the desiring person PW. The information processing according to the present example embodiment includes first processing (see FIG. 14) executed by the first terminal 202, second processing (see FIGS. 15 and 16) executed by the information processing apparatus 201, and third processing (see FIG. 17) executed by the second terminal 222.

First Processing According to the Second Example Embodiment

Figure 14:
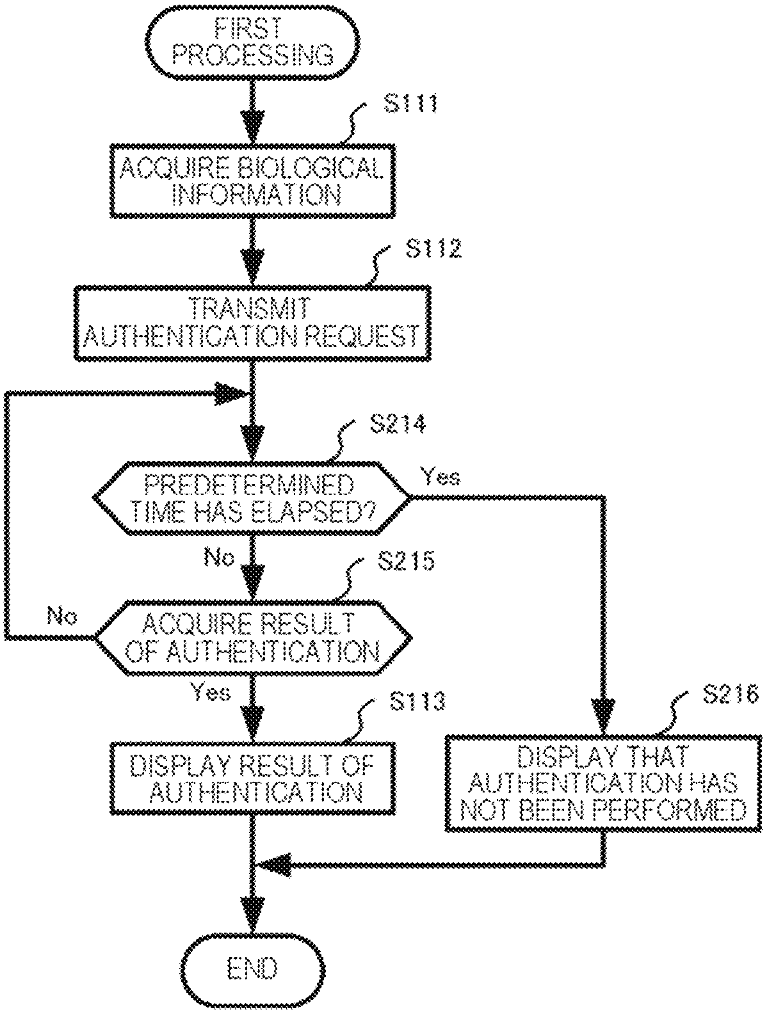
FIG. 14 is a flowchart illustrating one example of first processing according to the second example embodiment of the present invention.

FIG. 14 is referred to.

When, for example, a request of the desiring person PW (e.g., an instruction for capturing similar to that according to the first example embodiment) is accepted, the first terminal 202 starts information processing. The present example embodiment is also described by using an example in which biological information includes face information.

The sensor unit 121 and the request transmission unit 122 execute steps S111 and S112 similar to those according to the first example embodiment.

The display unit 206 determines whether a predetermined time has elapsed since step S112 was executed (step S214). When it is determined that the predetermined time has not elapsed (step S214; No), the display unit 206 determines whether a result of authentication has been acquired from the information processing apparatus 201 (step S215). When it is determined that a result of authentication has not been acquired (step S215; No), the display unit 206 executes step S214 again.

In other words, the display unit 206 waits for a predetermined time until acquiring a result of authentication by executing steps S214 and S215. The predetermined time may be determined as appropriate, and, for example, may be determined according to a maximum time, an average time, or the like from execution of step S112 to acquisition of a result of authentication when a result of authentication can be acquired from the information processing apparatus 201.

When it is determined that a predetermined time has elapsed (step S214; Yes), the display unit 206 displays that authentication has not been performed (step S216).

When it is determined that a result of authentication has been acquired (step S215; Yes), the display unit 206 executes processing in step S113 similar to that according to the first example embodiment, and ends the first processing.

Second Processing According to the Second Example Embodiment

Figure 15:
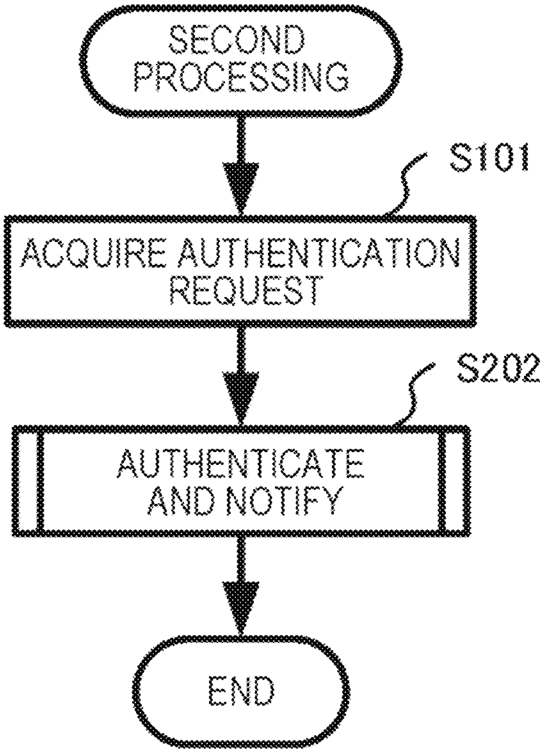
FIG. 15 is a flowchart illustrating one example of second processing according to the second example embodiment of the present invention.

FIG. 15 is referred to.

The acquisition unit 103 executes step S101 similar to that according to the first example embodiment.

When there is an agreement of the target person PT to an authentication request from the first terminal 202, the authentication unit 204*a* and the notification unit 104*b* authenticate the target person PT by using biological information of the target person PT, and notify the first terminal 202 of a result of the authentication (step S202). Biological information of the target person PT is biological information included in the authentication request acquired in step S101.

Figure 16:
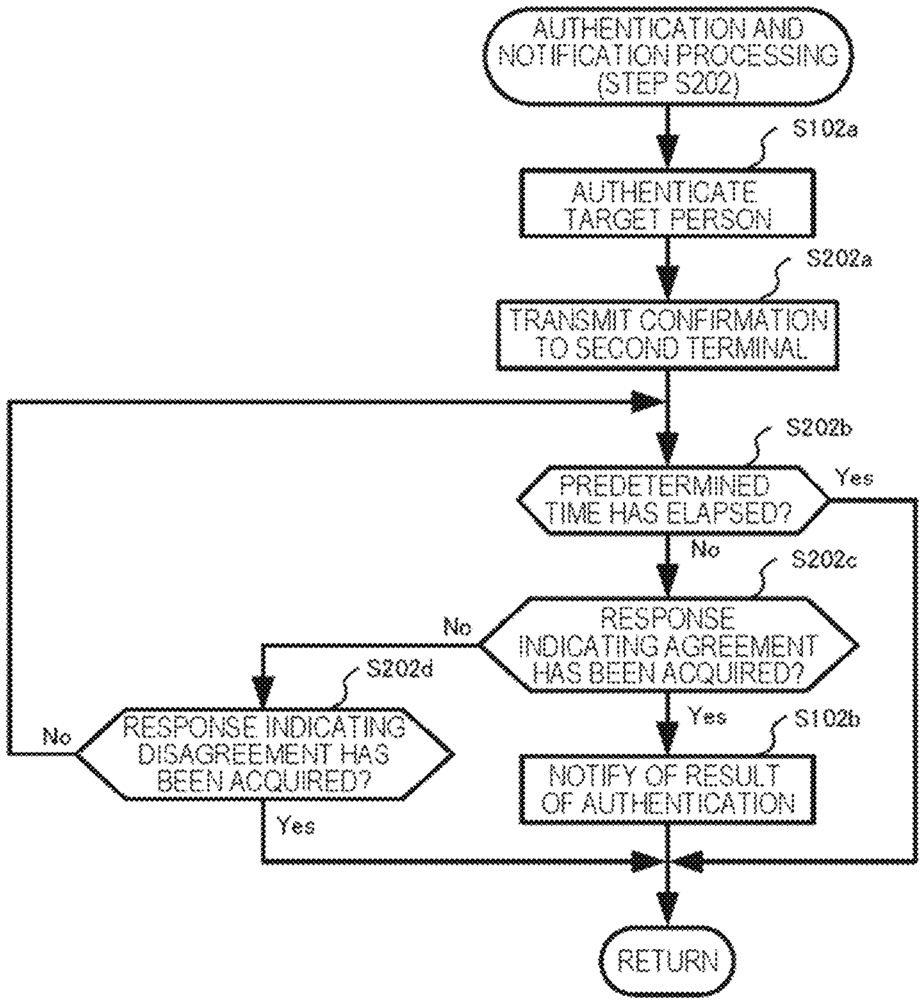
FIG. 16 is a flowchart illustrating a detailed example of authentication and notification processing according to the second example embodiment.

FIG. 16 is a flowchart illustrating a detailed example of authentication and notification processing (step S202) according to the second example embodiment.

The execution unit 212 executes step S102*a* similar to that according to the first example embodiment.

The confirmation unit 213 transmits confirmation of whether to agree to the authentication request acquired in step S101, to the second terminal 222 utilized by the target person PT via the network N (step S202*a*).

Specifically, for example, the confirmation unit 213 determines, based on the master information 211*a*, second terminal information associated with master biological information determined to match biological information of the target person PT in step S102*a*. The determined second terminal information is second terminal information relating to the second terminal 222 of the target person PT. The confirmation unit 213 transmits a confirmation of whether to agree to the authentication request, to the second terminal 222 indicated by the determined second terminal information. Upon receiving the confirmation, the second terminal 222 executes third processing described later.

The execution unit 212 determines whether a predetermined time has elapsed since the confirmation was transmitted in step S202*a* (step S202*b*). When it is determined that the predetermined time has not elapsed (step S202*b*; No), the execution unit 212 determines whether a response indicating an agreement has been acquired from the second terminal 222 (step S202*c*).

When it is determined that a response indicating an agreement has not been acquired (step S202*c*; No), the execution unit 212 determines whether a response indicating a disagreement has been acquired from the second terminal 222 (step S202*d*). When it is determined that a response indicating a disagreement has not been acquired (step S202*d*; No), the execution unit 212 executes step S202*b* again.

In other words, by executing steps S202*b* to S202*d*, the execution unit 212 waits for a predetermined time until acquiring, from the second terminal 222, a response indicating either an agreement or a disagreement. The predetermined time may be determined as appropriate, and, for example, may be determined according to a maximum time, an average time, or the like from execution of step S202*a* to acquisition of a result of authentication when a response can be acquired from the second terminal 222.

When it is determined that the predetermined time has elapsed (step S202*b*; Yes), or when it is determined that a response indicating a disagreement has been acquired (step S202*d*; Yes), the execution unit 212 ends the second processing (see FIG. 15).

When it is determined that a response indicating an agreement has been acquired (step S202*c*; Yes), the notification unit 104*b* executes step S102*b* similar to that according to the first example embodiment, and ends the second processing (see FIG. 15).

Third Processing According to the Second Example Embodiment

Figure 17:
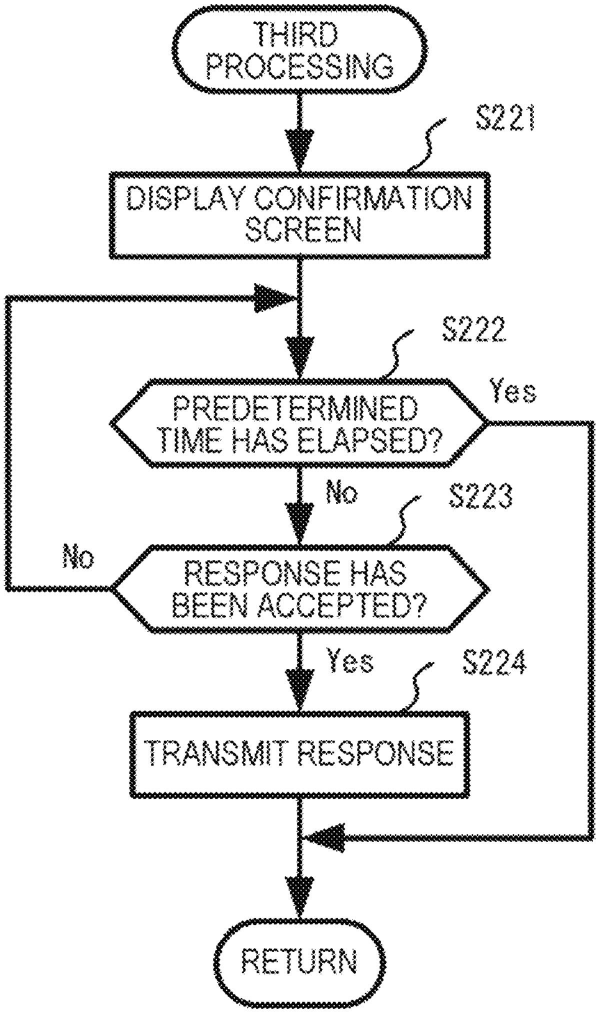
FIG. 17 is a flowchart illustrating one example of third processing according to the second example embodiment of the present invention.

FIG. 17 is referred to.

When confirmation transmitted in step S202*a* is acquired, the response unit 223 displays a confirmation screen (step S221).

Figure 18:
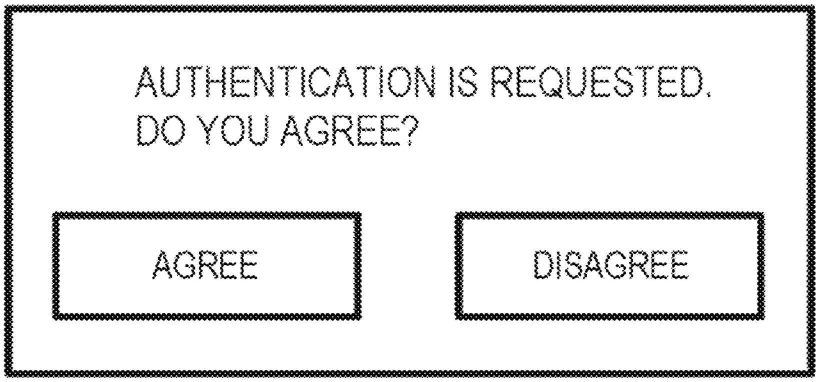
FIG. 18 is a diagram illustrating one example of a confirmation screen.

The confirmation screen is a screen for accepting a response from the target person PT to confirmation of whether to agree to an authentication request. FIG. 18 illustrates one example of a confirmation screen. For example, when one of buttons of "agree" and "disagree" illustrated in the figure is touched on a touch panel, the response unit 223 generates a response according to the touched button.

The response unit 223 determines whether a predetermined time has elapsed since display of the confirmation screen was performed in step S221 (step S222). When it is determined that the predetermined time has not elapsed (step S222; No), the response unit 223 determines whether a response has been accepted from the target person PT (step S223). In a case of the confirmation screen illustrated in FIG. 18, the response unit 223 determines whether one of the buttons of "agree" and "disagree" is touched. When it is determined that no response has been accepted (step S223; No), the response unit 223 executes step S222 again.

In other words, by executing steps S222 and S223, the response unit 223 waits for a predetermined time until accepting a response to the authentication request from the target person PT. The predetermined time may be determined as appropriate, and, for example, may be determined according to a maximum time, an average time, or the like from display of the confirmation screen to acceptance of a response, when a response can be acquired from the target person PT.

When it is determined that the predetermined time has elapsed (step S222; Yes), the response unit 223 ends the third processing.

When it is determined that a response has been accepted (step S223; Yes), the response unit 223 transmits the accepted response to the information processing apparatus 201 via the network N (step S224).

Specifically, for example, when the button of "agree" is touched on the confirmation screen illustrated in FIG. 18, the response unit 223 transmits a response indicating an agreement to the information processing apparatus 201 via the network N. Moreover, when the button of "disagree" is touched, the response unit 223 transmits a response indicating a disagreement to the information processing apparatus 201 via the network N.

So far, the second example embodiment of the present invention has been described.

According to the present example embodiment, the information processing apparatus 201 includes the authentication unit 204*a* that authenticates the target person PT by using biological information. The notification unit 104*b* notifies the first terminal of a result of authentication by the authentication unit 204*a* when a previously determined execution condition is satisfied.

Thereby, the desiring person PW can know a result of authenticating the target person PT as necessary, on condition that the execution condition is satisfied. Since notification of an authentication result of the target person PT needs satisfaction of the execution condition, privacy of the target person PT, smooth prosecution or the like of work in a predetermined organization, a company, and the like can be protected. Therefore, it becomes possible for the desiring person PW to acquire a result of authenticating the target person PT as necessary while protecting privacy of the target person PT and smooth prosecution or the like of work in a predetermined organization, a company, and the like.

According to the present example embodiment, an execution condition includes a matter that there is an agreement of the target person PT to an authentication request (individual agreement condition). The authentication unit 204*a* includes the confirmation unit 213 and the execution unit 212. When an authentication request is acquired from the first terminal 202, the confirmation unit 213 transmits confirmation of whether to agree to the authentication request to the second terminal 222 utilized by the target person PT. The execution unit 212 authenticates the target person PT by using biological information.

Thereby, the desiring person PW can acquire a result of authenticating the target person PT as necessary, on condition that there is an agreement of the target person PT. Since notification of an authentication result of the target person PT can be conditioned on an agreement of the target person PT to an authentication request, privacy of the target person PT and smooth prosecution or the like of work in a predetermined organization, a company, and the like can be protected. Therefore, it becomes possible for the desiring person PW to acquire a result of authenticating the target person PT as necessary while protecting privacy of the target person PT and smooth prosecution or the like of work in a predetermined organization, a company, and the like.

Second Modified Example

In the second example embodiment, as illustrated in FIG. 16, an example has been described in which, between step S102*a* and step S102*b*, the confirmation unit 213 transmits, in step S202*a*, confirmation of whether to agree to the authentication request to the second terminal 222 utilized by the target person PT. In other words, an example has been described in which the notification unit 104*b* notifies of a result of authentication when the execution condition is satisfied, and does not notify a result of authentication when the execution condition is not satisfied.

However, the authentication unit 204*a* may authenticate the target person PT by using biological information, when a previously determined execution condition is satisfied. Specifically, the authentication unit 204*a* may authenticate the target person PT when the previously determined execution condition is satisfied, and may not authenticate the target person PT when the previously determined execution condition is not satisfied. In other words, before executing processing for authenticating the target person PT (step S102*a* or a processing equivalent thereto), the confirmation unit 213 may transmit confirmation of whether to agree to the authentication request to the second terminal 222 utilized by the target person PT. According to the second modified example as well, as described below, the notification unit 104*b* does not notify a result of authentication by the authentication unit 204*a* when the execution condition is not satisfied.

Figure 19:
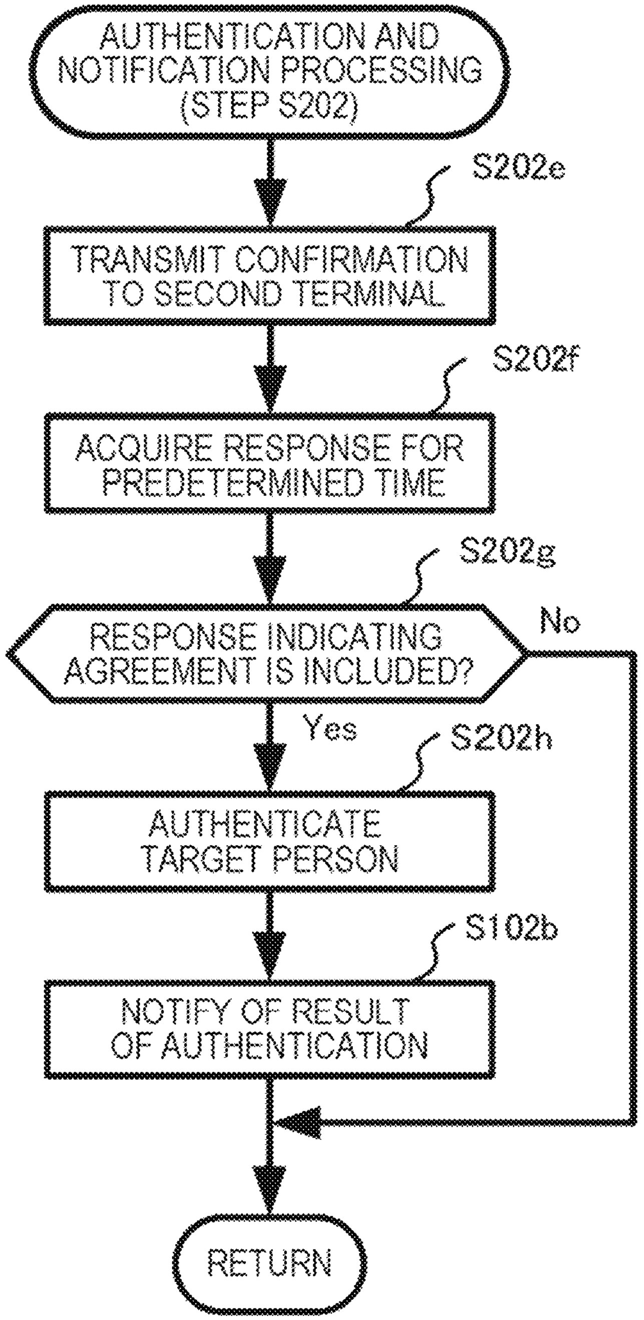
FIG. 19 is a flowchart illustrating an example of authentication and notification processing according to a second modified example.

FIG. 19 is a flowchart illustrating an example of authentication and notification processing (step S202) according to a second modified example.

The confirmation unit 213 transmits confirmation of whether to agree to the authentication request acquired in step S101, to pieces of second terminal information of all registrants included in the master information 211*a*, via the network N (step S202*e*).

The execution unit 212 acquires a response from the second terminal 222 for a predetermined time (step S202*f*). In other words, the execution unit 212 continues acquisition of a response from the second terminal 222 for a predetermined time.

The execution unit 212 determines whether the response acquired in step S202*f* includes a response indicating an agreement (step S202*g*). When it is determined that a response indicating an agreement is not included (step S202*g*; No), the execution unit 212 ends the second processing (see FIG. 15). In this way, in the present modified example, when the execution condition is not satisfied, the authentication unit 204*a* does not execute S202*h*, and, therefore, the notification unit 104*b* does not notify a result of authentication either.

When it is determined that a response indicating an agreement is included (step S202*g*; Yes), the execution unit 212 executes step S202*h* that replaces step S102*a*. Then, the notification unit 104*b* executes step S102*b* similar to that according to the first example embodiment, and ends the second processing (see FIG. 15). In this way, in the present modified example, when the execution condition is satisfied, the authentication unit 204*a* executes S202*h*, and the notification unit 104*b* notifies of a result of authentication.

Step S202*h* is similar to step S102*a* in that the execution unit 212 authenticates the target person PT by using biological information of the target person PT included in the authentication request acquired in step S101 and master biological information registered in the master information 111*a*. In step S202*h*, instead of pieces of master biological information of all registrants included in the master information 111*a*, it is determined whether master biological information of a registrant utilizing the second terminal 222 that has transmitted a response indicating an agreement matches biological information of the target person PT.

Specifically, for example, in step S202*h*, the execution unit 212 determines, based on the master information 111*a*, master biological information associated with second terminal information of the second terminal 222 that has transmitted a response indicating an agreement. The execution unit 212 authenticates the target person PT, based on the biological information of the target person PT included in the authentication request acquired in step S101, and the determined master biological information.

More specifically, when the determined master biological information includes master biological information that matches the biological information of the target person PT, the execution unit 212 determines that authentication of the target person PT has succeeded. When the determined master biological information does not include master biological information that matches the biological information of the target person PT, the execution unit 212 determines that authentication of the target person PT has failed.

The desiring person PW is in status of capturing the target person PT, and therefore normally faces the target person PT. Thus, the target person PT knows that an authentication request is transmitted from the first terminal 202. By appropriately setting a predetermined time (step S202*f*) for acquiring a response, the execution unit 212 can normally acquire a response from the second terminal 222 utilized by the target person PT within a predetermined time.

Therefore, in the second example embodiment, even when the authentication and notification processing (step S202) illustrated in FIG. 19 is executed instead of the authentication and notification processing (step S202) illustrated in FIG. 16, an advantageous effect similar to that according to the first example embodiment described above is provided.

Moreover, in step S202*h*, as described above, it is determined whether master biological information of a registrant utilizing the second terminal 222 that has transmitted a response indicating an agreement matches biological information of the target person PT. Compared to determining whether each of pieces of master biological information of all registrants matches biological information of the target person PT as in step S102*a*, the number of execution of determination processing of whether the pieces of information match can be reduced. Therefore, it becomes possible to reduce a processing load for authenticating the target person PT.

Third Example Embodiment

In the second example embodiment, an example in which an execution condition includes an individual agreement condition has been described, but the execution condition is not limited thereto. In the present example embodiment, an example is described in which an execution condition includes a condition (permission condition) previously set regarding a target person PT. In the present example embodiment, in order to simplify description, description overlapping those in other example embodiments is omitted as appropriate.

Figure 20:
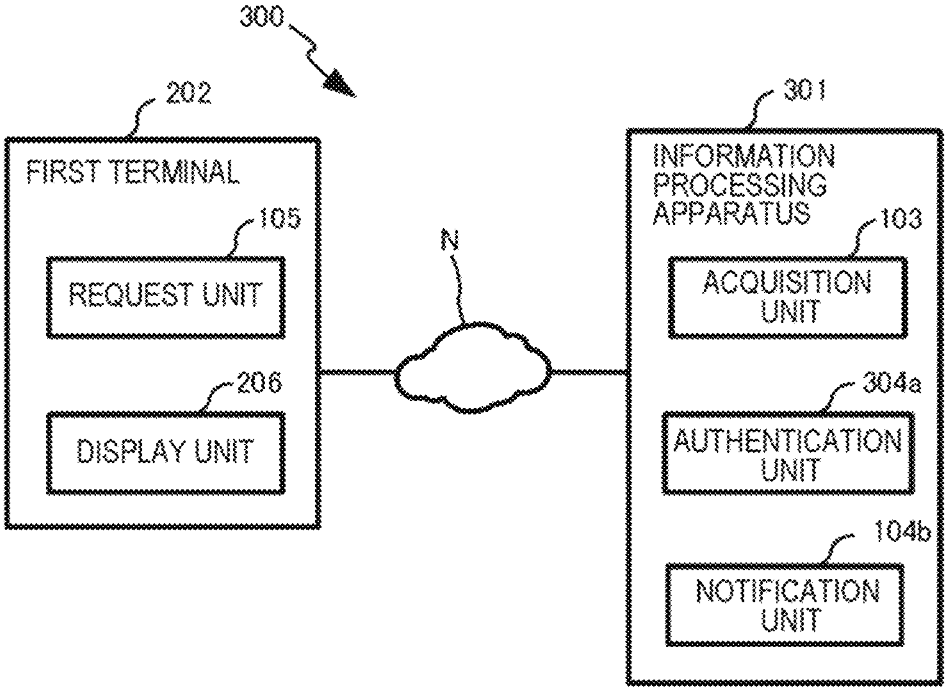
FIG. 20 is a diagram illustrating a configuration example of an information processing system according to a third example embodiment of the present invention.

FIG. 20 is a diagram illustrating a configuration example of an information processing system 300 according to a third example embodiment.

The information processing system 300 includes an information processing apparatus 301 that replaces the information processing apparatus 101 according to the first example embodiment, and a first terminal 202 similar to that according to the second example embodiment. The information processing apparatus 301 and the first terminal 202 are connected to each other via a network N, and can transmit and receive data to and from each other via the network N.

The information processing apparatus 301 includes an acquisition unit 103 and a notification unit 104*b* similar to those according to the first example embodiment, and an authentication unit 304*a* that replaces the authentication unit 104*a* according to the first example embodiment.

Similarly to the authentication unit 204*a* according to the second example embodiment, the authentication unit 304*a* authenticates the target person PT by using biological information of the target person PT acquired by the acquisition unit 103 when a previously determined execution condition is satisfied.

Similarly to the second example embodiment, the execution condition is a condition for notifying of a result of authenticating the target person PT. The authentication unit 304*a* and the notification unit 104*b* do not execute at least one of authentication of the target person PT and notification of a result of authentication when the execution condition is not satisfied. The present example embodiment is described by using an example in which the authentication unit 304*a* does not execute authentication of the target person PT when the execution condition is not satisfied. As described in the second example embodiment, as a result, the notification unit 104*b* does not notify a result of authentication.

In the present example embodiment, the execution condition includes a permission condition previously set regarding the target person PT. The permission condition according to the present example embodiment is that there is a comprehensive prior agreement of the target person PT.

Note that, the permission condition is not limited thereto, and may include at least one of, for example, a matter that the target person PT is on duty, a matter that it is in a previously determined time period in which authentication is permitted, a matter that there is a comprehensive prior agreement of the target person PT, and the like.

Figure 21:
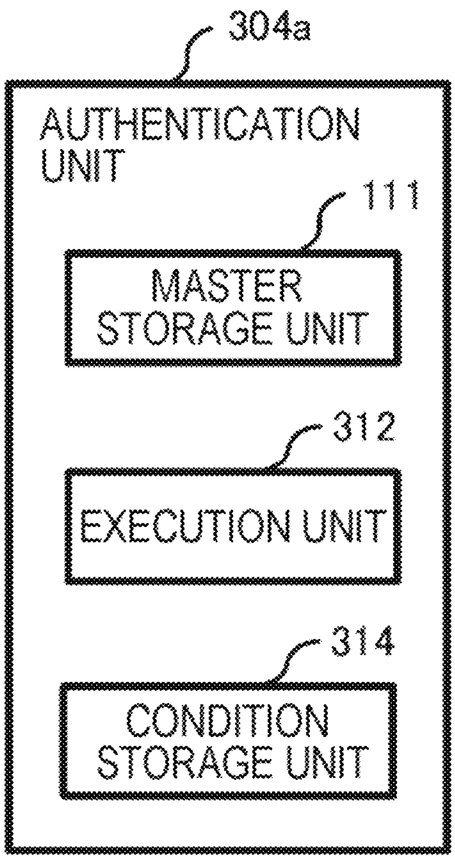
FIG. 21 is a diagram illustrating a detailed example of a functional configuration of an authentication unit according to the third example embodiment.

FIG. 21 is a diagram illustrating a detailed example of a functional configuration of the authentication unit 304*a* according to the third example embodiment. The authentication unit 304*a* includes a master storage unit 111 similar to that according to the first example embodiment, and an execution unit 312 that replaces the execution unit 112 according to the first example embodiment. The authentication unit 304*a* further includes a condition storage unit 314.

The condition storage unit 314 is a storage unit for storing condition information 314*a* indicating a permission condition previously set regarding the target person PT.

FIG. 22 is a diagram illustrating one example of a configuration of the condition information 314*a* according to the third example embodiment. The condition information 314*a* according to the present example embodiment associates a registrant identifier (ID) and information indicating presence or absence of a comprehensive agreement. The information indicating presence or absence of a comprehensive agreement includes, for example, "1" when there is a comprehensive agreement, and "0" when there is no comprehensive agreement.

Note that, when the permission condition includes a matter that the target person PT is on duty, the condition information 314*a* may be associated with, for example, a duty hour of a registrant. When the permission condition includes a matter that it is in a previously determined time period in which authentication is permitted, the condition information 314*a* may associate, for example, a time period in which a registrant permits authentication with a registrant ID.

The execution unit 312 authenticates the target person PT by using biological information of the target person PT acquired by the acquisition unit 103. In the present example embodiment, the execution unit 312 authenticates the target person PT by using the biological information of the target person PT acquired by the acquisition unit 103, when the permission condition is satisfied.

So far, the functional configuration example of the information processing system 300 according to the third example embodiment of the present invention has been mainly described.

The information processing apparatus 301 according to the present example embodiment may be physically configured similarly to the information processing apparatus 101 according to the first example embodiment.

Operation of the Information Processing System 300

From here, an operation example of the information processing system 300 according to the third example embodiment is described. Similarly to the first example embodiment, the information processing system 300 executes information processing for authenticating the target person PT in response to a request of the desiring person PW, and notifying of a result thereof. The information processing according to the present example embodiment includes first processing (see FIG. 14) similar to that according to the second example embodiment, and second processing (see FIGS. 23 and 24) executed by the information processing apparatus 301.

Second Processing According to the Third Example Embodiment

Figure 23:
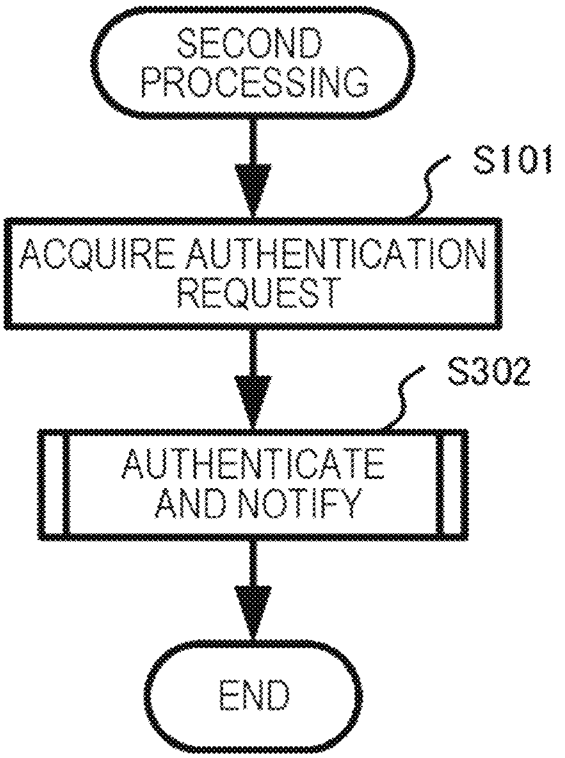
FIG. 23 is a flowchart illustrating one example of second processing according to the third example embodiment of the present invention.

FIG. 23 is referred to.

The acquisition unit 103 executes step S101 similar to that according to the first example embodiment.

When the permission condition is satisfied, the authentication unit 304*a* and the notification unit 104*b* authenticate the target person PT by using the biological information of the target person PT, and notify the first terminal 202 of a result of the authentication (step S302). The biological information of the target person PT is biological information included in the authentication request acquired in step S101.

Figure 24:
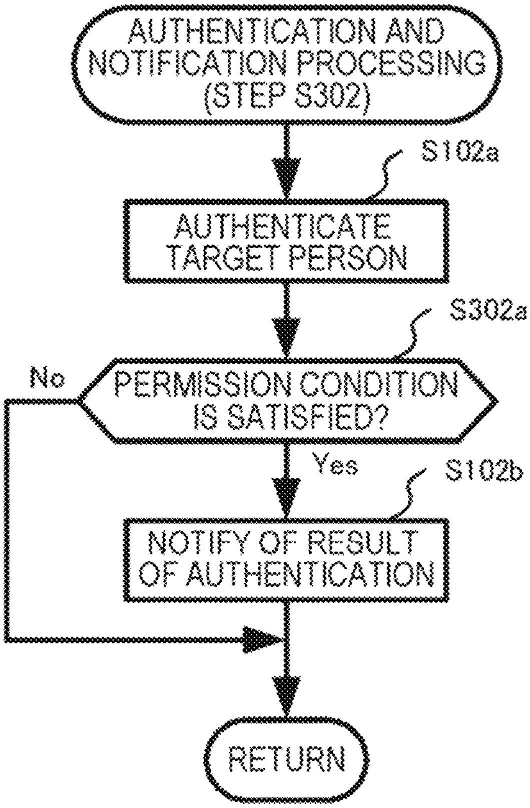
FIG. 24 is a flowchart illustrating a detailed example of authentication and notification processing according to the third example embodiment.

FIG. 24 is a flowchart illustrating a detailed example of the authentication and notification processing (step S302) according to the third example embodiment.

The execution unit 312 executes step S102*a* similar to that according to the first example embodiment.

The execution unit 312 determines whether the permission condition is satisfied, based on the condition information 314*a* stored in the condition storage unit 314 (step S302*a*).

Specifically, for example, the execution unit 312 determines, based on the master information 211*a*, a registrant ID associated with master biological information determined to match the biological information of the target person PT in step S102*a*. The determined registrant ID is a registrant ID of the target person PT. The execution unit 312 acquires information indicating presence or absence of a comprehensive agreement associated with the determined registrant ID, based on the condition information 314*a*. The execution unit 312 determines, based on the acquired information, whether the permission condition is satisfied.

For example, when the acquired information indicates that there is a comprehensive agreement, the execution unit 312 determines that the permission condition is satisfied. When the acquired information indicates that there is no comprehensive agreement, the execution unit 312 determines that the permission condition is not satisfied.

Note that, when the permission condition includes a matter that the target person PT is on duty, the execution unit 312 may acquire, based on the condition information 314*a*, a duty hour associated with the determined registrant ID. Moreover, when the permission condition includes a matter that it is in a previously determined time period in which authentication is permitted, the execution unit 312 may acquire, based on the condition information 314*a*, a time period associated with the determined registrant ID. Then, the execution unit 312 may determine whether the permission condition is satisfied, based on whether a time when an authentication request is acquired in step S101 is included in the acquired duty hour or time period. When the time when the authentication request is acquired is included in the duty hour or time period, the execution unit 312 may determine that the permission condition is satisfied. In a case where the time when the authentication request is acquired is not included in the duty hour or time period, the execution unit 312 may determine that the permission condition is not satisfied.

When it is determined that the permission condition is not satisfied (step S302*a*; No), the execution unit 312 ends the second processing (see FIG. 23).

When it is determined that the permission condition is satisfied (step S302*a*; Yes), the notification unit 104*b* executes step S102*b* similar to that according to the first example embodiment, and ends the second processing (see FIG. 23).

So far, the third example embodiment of the present invention has been described.

According to the present example embodiment, the information processing apparatus 201 includes an authentication unit 304*a* that authenticates the target person PT by using biological information. The notification unit 104*b* notifies the first terminal 202 of a result of authentication by the authentication unit 204*a* when a previously determined execution condition is satisfied. Therefore, similarly to the second example embodiment, it becomes possible for the desiring person PW to acquire a result of authenticating the target person PT as necessary while protecting privacy of the target person PT and smooth prosecution or the like of work in a predetermined organization, a company, and the like.

According to the present example embodiment, an execution condition includes a previously set permission condition regarding the target person PT. The notification unit 104*b* notifies the first terminal 202 of a result of authentication by the authentication unit 304*a* when the permission condition is satisfied.

Thereby, the desiring person PW can acquire a result of authenticating the target person PT as necessary, on condition that the permission condition is satisfied. Moreover, since notification of an authentication result of the target person PT needs satisfaction of the execution condition, privacy of the target person PT, smooth prosecution or the like of work in a predetermined organization, a company, and the like can be protected. Therefore, it becomes possible for the desiring person PW to acquire a result of authenticating the target person PT as necessary while protecting privacy of the target person PT and smooth prosecution or the like of work in a predetermined organization, a company, and the like.

According to the present example embodiment, the authentication unit 304*a* includes the condition storage unit 314 for storing the condition information 314*a* indicating a permission condition, and an execution unit 312 that authenticates the target person PT by using biological information.

Thereby, the desiring person PW can authenticate the target person PT as necessary, on condition that a permission condition held by the information processing apparatus 201 is satisfied. Since notification of an authentication result of the target person PT can be conditioned on satisfaction of the execution condition, privacy of the target person PT and smooth prosecution or the like of work in a predetermined organization, a company, and the like can be protected. Therefore, it becomes possible for the desiring person PW to acquire a result of authenticating the target person PT as necessary while protecting privacy of the target person PT and smooth prosecution or the like of work in a predetermined organization, a company, and the like.

Fourth Example Embodiment

In the third example embodiment, an example has been described in which the information processing apparatus 301 stores a permission condition. The second terminal utilized by the target person PT may store the permission condition. In the present example embodiment, in order to simplify description, description overlapping those in other example embodiments is omitted as appropriate.

Figure 25:
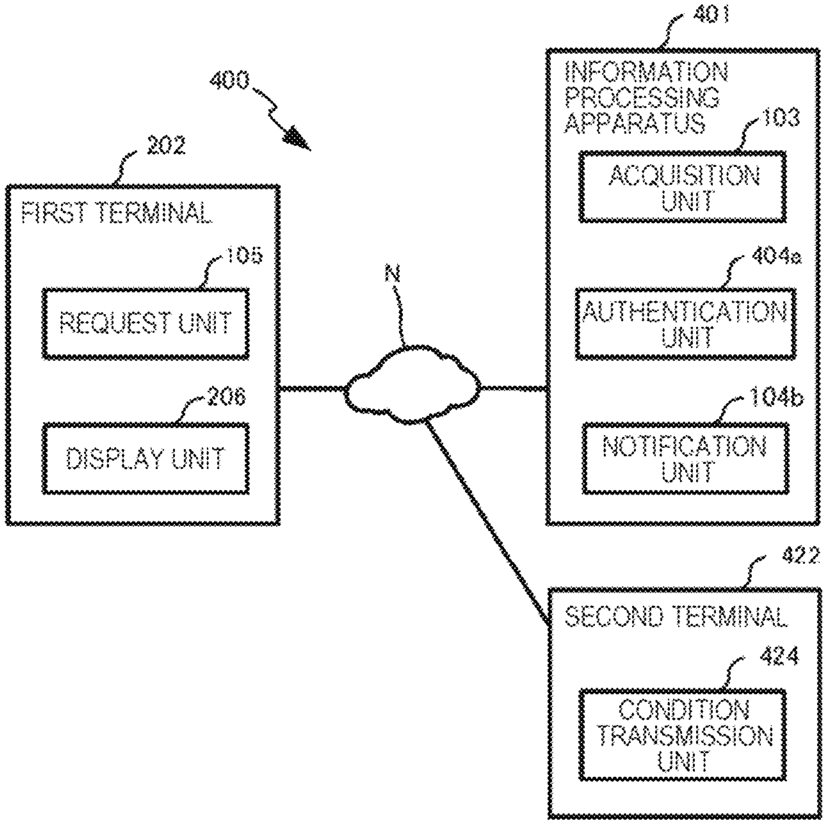
FIG. 25 is a diagram illustrating a configuration example of an information processing system according to a fourth example embodiment of the present invention.

FIG. 25 is a diagram illustrating a configuration example of an information processing system 400 according to a fourth example embodiment.

The information processing system 400 includes an information processing apparatus 401 that replaces the information processing apparatus 301 according to the third example embodiment, a first terminal 202 similar to that according to second example embodiment, and a second terminal 422 utilized by a target person PT. The information processing apparatus 401, the first terminal 202, and the second terminal 422 are connected to each other via a network N, and can transmit and receive data to and from each other via the network N.

The information processing apparatus 401 includes an acquisition unit 103 and a notification unit 104*b* similar to those according to the first example embodiment, and an authentication unit 404*a* that replaces the authentication unit 104*a* according to the first example embodiment.

The authentication unit 404*a* acquires condition information including a permission condition from the second terminal 422 by inquiring the second terminal 422 about the permission condition. The authentication unit 404*a* authenticates the target person PT by using biological information of the target person PT acquired by the acquisition unit 103. Except for this point, the authentication unit 404*a* is generally similar to the authentication unit 304*a* according to the third example embodiment. In other words, the authentication unit 404*a* and the notification unit 104*b* do not execute at least one of authentication of the target person PT and notification of a result of authentication when the execution condition is not satisfied. The present example embodiment is described by using an example in which the authentication unit 404*a* does not execute authentication of the target person PT when the execution condition is not satisfied.

Figure 26:
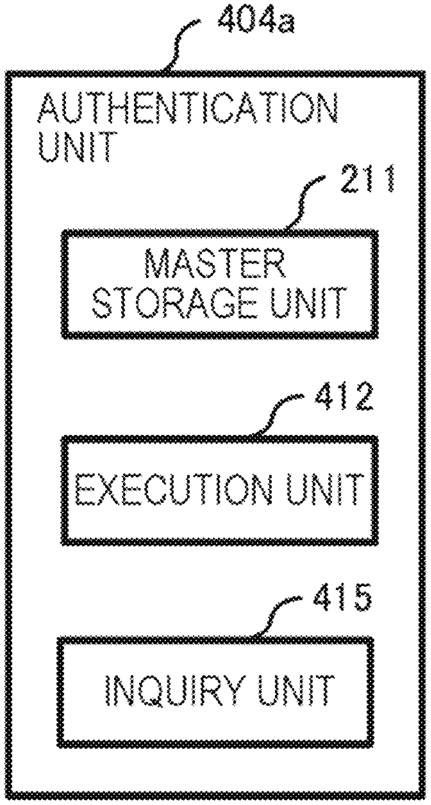
FIG. 26 is a diagram illustrating a detailed example of a functional configuration of an authentication unit according to the fourth example embodiment.

FIG. 26 is a diagram illustrating a detailed example of a functional configuration of the authentication unit 404*a* according to the fourth example embodiment. The authentication unit 404*a* includes a master storage unit 211 similar to that according to the second example embodiment, and an execution unit 412 that replaces the execution unit 312 similar to that according to the third example embodiment. The authentication unit 404*a* further includes an inquiry unit 415.

When an authentication request is acquired from the first terminal 202, the inquiry unit 415 inquires of the second terminal 422 utilized by the target person PT about a permission condition.

The execution unit 412 authenticates the target person PT by using biological information. In the present example embodiment, the execution unit 412 authenticates the target person PT by using biological information when a permission condition acquired in response to inquiry is satisfied.

FIG. 25 is referred to again.

The second terminal 422 includes a condition transmission unit 424. The condition transmission unit 424 stores condition information including a permission condition for the target person PT utilizing the second terminal 422. When inquiry of a permission condition is acquired from the information processing apparatus 401, the condition transmitting unit 424 transmits condition information to the information processing apparatus 401.

So far, the functional configuration example of the information processing system 400 according to the fourth example embodiment of the present invention has been mainly described. The information processing apparatus 401 according to the present example embodiment may be physically configured similarly to the information processing apparatus 101 according to the first example embodiment.

(Operation of the Information Processing System 400)

From here, an operation example of the information processing system 400 according to the fourth example embodiment is described. Similarly to the first example embodiment, the information processing system 400 executes information processing for authenticating the target person PT in response to a request from the desiring person PW, and notifying of a result thereof. The information processing according to the present example embodiment includes first processing (see FIG. 14) similar to that according to second example embodiment, second processing (see FIGS. 27 and 28) executed by the information processing apparatus 401, and third processing (see FIG. 29) executed by the second terminal 422.

Second Processing According to the Fourth Example Embodiment

Figure 27:
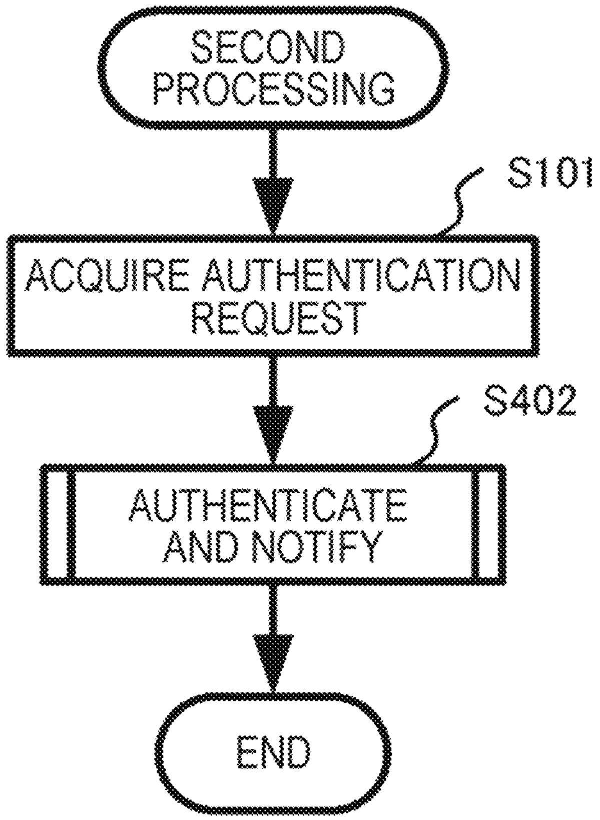
FIG. 27 is a flowchart illustrating one example of second processing according to the fourth example embodiment of the present invention.

FIG. 27 is referred to.

The acquisition unit 103 executes step S101 similar to that according to the first example embodiment.

When the permission condition is satisfied, the authentication unit 404*a* and the notification unit 104*b* authenticate the target person PT by using biological information of the target person PT, and notify the first terminal 202 of a result of the authentication (step S402). The biological information of the target person PT is biological information included in the authentication request acquired in step S101.

Figure 28:
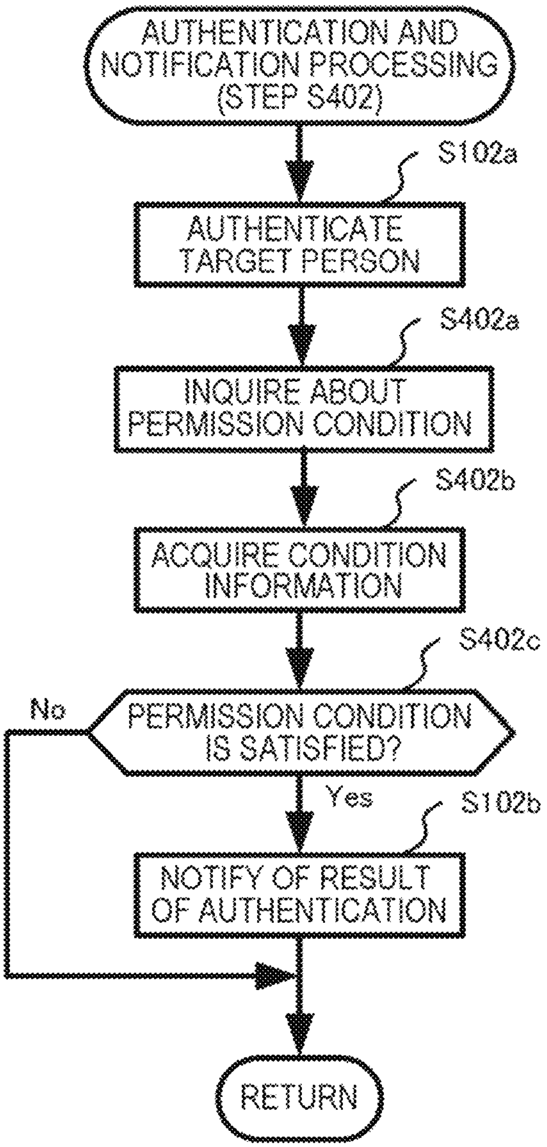
FIG. 28 is flowchart illustrating a detailed example of authentication and notification processing according to the fourth example embodiment.

FIG. 28 is a flowchart illustrating a detailed example of authentication and notification processing (step S402) according to the fourth example embodiment.

The execution unit 412 executes step S102*a* similar to that according to the first example embodiment.

The inquiry unit 415 inquires of the second terminal 422 utilized by the target person PT about the permission condition (step S402*a*). In response to the inquiry, the second terminal 422 executes third processing described later.

Specifically, for example, the inquiry unit 415 determines, based on the master information 211*a*, second terminal information associated with master biological information determined to match the biological information of the target person PT in step S102*a*. The determined second terminal information is second terminal information related to the second terminal 422 utilized by the target person PT. The inquiry unit 415 transmits an inquiry about a permission condition to the determined second terminal information.

The execution unit 412 acquires condition information including a permission condition in response to the inquiry in step S402*a* (step S402*b*).

The execution unit 412 determines whether the permission condition is satisfied, based on the permission condition included in the condition information (step S402*c*).

When it is determined that the permission condition is not satisfied (step S402*c*; No), the execution unit 412 ends the second processing (see FIG. 27).

When it is determined that the permission condition is satisfied (step S402*c*; Yes), the notification unit 102*b* executes step S102*b* similar to that according to the first example embodiment, and ends the second processing (see FIG. 27).

Third Processing According to the Fourth Example Embodiment

Figure 29:
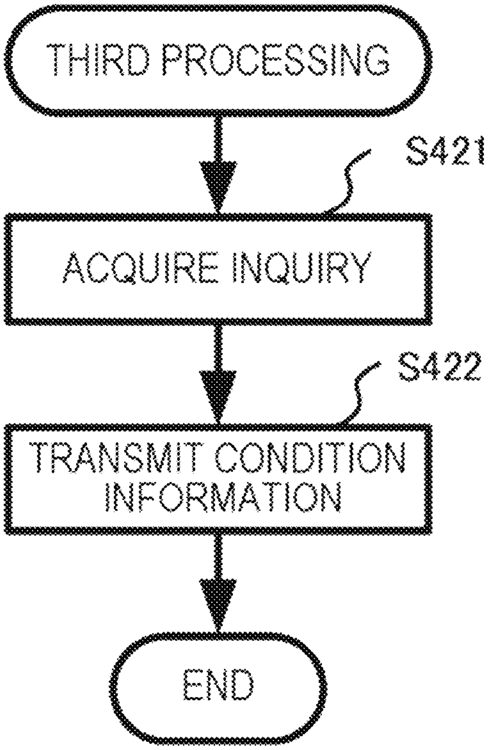
FIG. 29 is flowchart illustrating one example of third processing according to the fourth example embodiment of the present invention.

FIG. 29 is referred to.

The condition transmitting unit 424 acquires the inquiry transmitted in step S402*a* (step S421).

The condition transmitting unit 424 transmits condition information to the information processing apparatus 401 (step S422), and ends the third processing.

So far, the fourth example embodiment of the present invention has been described.

According to the present example embodiment, the authentication unit 404*a* includes the inquiry unit 415 and the execution unit 412. When an authentication request is acquired from the first terminal 202, the inquiry unit 415 inquires of the second terminal 422 utilized by the target person PT about a permission condition. The execution unit 412 authenticates the target person PT by using biological information.

Thereby, the desiring person PW can authenticate the target person PT as necessary, on condition that the permission condition acquired from the second terminal 422 in response to the inquiry is satisfied. Since notification of an authentication result of the target person PT can be conditioned on satisfaction of the execution condition, privacy of the target person PT and smooth prosecution or the like of work in a predetermined organization, a company, and the like can be protected. Therefore, it becomes possible for the desiring person PW to acquire a result of authenticating the target person PT as necessary while protecting privacy of the target person PT and smooth prosecution or the like of work in a predetermined organization, a company, and the like.

Modified Example 3

The second example embodiment and the third example embodiment or the fourth example embodiment may be combined.

In this case, the execution condition includes a previously set permission condition regarding the target person PT, and a matter that there is an agreement of the target person PT to an authentication request (individual agreement condition). The notification unit notifies the execution unit of a result of authentication by the execution unit when a response indicating an agreement to the authentication request is acquired from the second terminal and the permission condition is satisfied.

When the second example embodiment and the third example embodiment are combined, the authentication unit may include, for example, a condition storage unit 314 for storing condition information 314*a* indicating a permission condition. In a case where the second example embodiment and the fourth example embodiment are combined, the authentication unit may include, for example, an inquiry unit 415 that inquires of the second terminal utilized by the target person PT about a permission condition when an authentication request is acquired from the first terminal.

According to the present modified example, similarly to the second to fourth example embodiments, it becomes possible for the desiring person PW to authenticate the target person PT as necessary while protecting privacy of the target person PT and smooth prosecution or the like of work in a predetermined organization, a company, and the like.

Fifth Example Embodiment

In the information processing system 100 according to the first example embodiment, an example has been described in which the execution unit 112 determines whether each of pieces of master biological information of all registrants included in the master information 111*a* matches biological information of the target person PT.

However, when determination of whether each of pieces of master biological information of all registrants matches biological information of the target person PT is performed, there is a concern that the number of execution of determination processing increases, and a processing load for authenticating the target person PT increases. In the present example embodiment, an example of an information processing system and the like for enabling reducing a processing load for authenticating the target person PT is described. In the present example embodiment, in order to simplify description, description overlapping that in the first example embodiment is omitted as appropriate.

Figure 30:
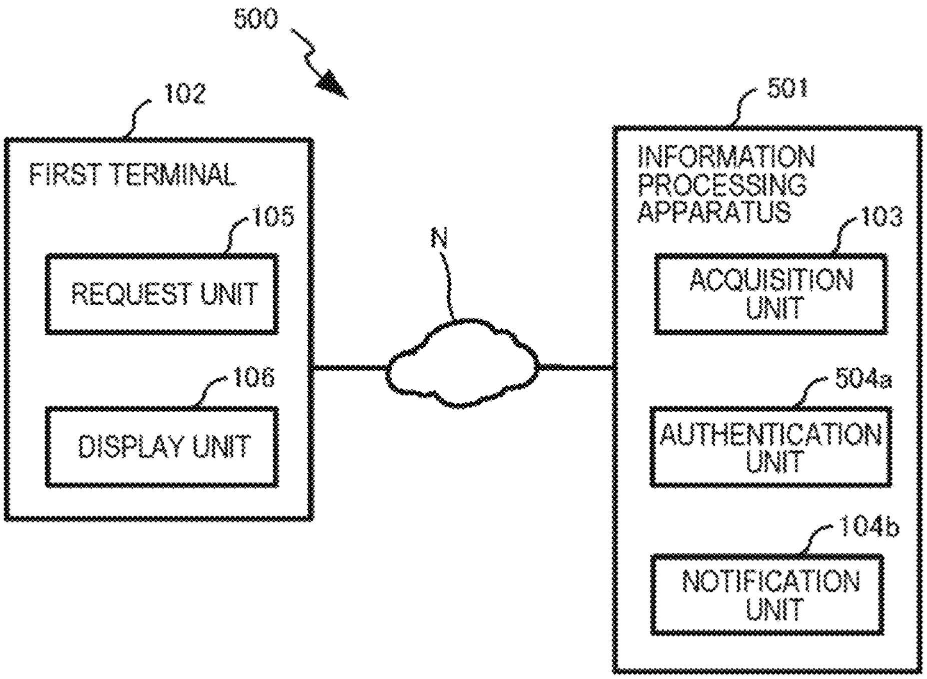
FIG. 30 is a diagram illustrating a configuration example of an information processing system according to a fifth example embodiment of the present invention.

FIG. 30 is a diagram illustrating a configuration example of an information processing system 500 according to the fifth example embodiment.

The information processing system 500 includes an information processing apparatus 501 that replaces the information processing apparatus 101 according to the first example embodiment, and a first terminal 102 similar to that according to the first terminal. The information processing apparatus 501 and the first terminal 102 are connected to each other via a network N, and can transmit and receive data to and from each other via the network N.

An authentication request according to the present example embodiment includes a current position of the first terminal 102. A method whereby the first terminal 102 acquires a current position may be a known method, and, for example, a global positioning system (GPS), wireless local area network (LAN), or the like may be utilized.

The information processing apparatus 501 includes an acquisition unit 103 and a notification unit 104*b* similar to those according to the first example embodiment, and an authentication unit 504*a* that replaces the authentication unit 104*a* according to the first example embodiment.

(Detailed Configuration Example of the Authentication Unit 504*a*)

Similarly to the authentication unit 104*a* according to the first example embodiment, the authentication unit 504*a* authenticates the target person PT by using the biological information of the target person PT acquired by the acquisition unit 103 and the master biological information registered in the master information 111*a*.

Figure 31:
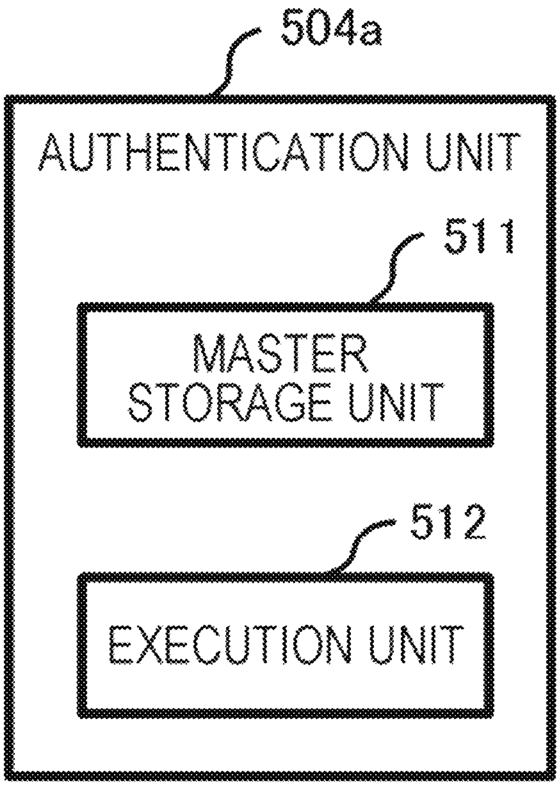
FIG. 31 is a diagram illustrating a detailed example of a functional configuration of an authentication unit according to the fifth example embodiment.

FIG. 31 is a diagram illustrating a detailed example of a functional configuration of the authentication unit 504*a* according to the fifth example embodiment. The authentication unit 504*a* includes a master storage unit 511 and an execution unit 512 that replace the master storage unit 111 and execution unit 112 according to the first example embodiment.

The master storage unit 511 is a storage unit for storing master information 511*a*. The master information 511*a* is information relating to a registrant. The master information 511*a* is previously registered in master storage unit 511.

Figure 32:
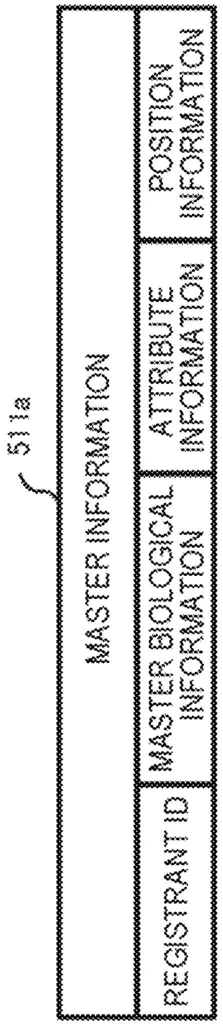
FIG. 32 is a diagram illustrating one example of a configuration of master information according to the fifth example embodiment.

FIG. 32 is a diagram illustrating one example of a configuration of the master information 511*a* according to the fifth example embodiment. The master information 511*a* associates a registrant identifier (ID), master biological information, attribute information, and position information of a common registrant.

Position information is information indicating a position of a registrant. The position information is, for example, information indicating a current position of a registrant, information indicating a range in which a registrant moves on duty, or the like.

When position information indicates a current position of a registrant, for example, the execution unit 512 may acquire position information from a second terminal (not illustrated) utilized by the registrant and set the position information in the master information 511*a*. When position information indicates a range in which a registrant moves on duty, the position information may be previously set.

FIG. 31 is referred to.

Based on the master information 511*a*, the execution unit 512 extracts a registrant for whom a current position of the first terminal 102 included in an authentication request and position information included in the master information 511*a* have a previously determined relationship. The execution unit 512 authenticates the target person PT by using the master biological information and biological information of the extracted registrant.

So far, the functional configuration example of the information processing system 500 according to the fifth example embodiment of the present invention has been mainly described.

The information processing apparatus 501 according to the present example embodiment may be physically configured similarly to the information processing apparatus 101 according to the first example embodiment. Note that, the first terminal 202 may physically include a sensor or the like for acquiring a current position. Moreover, when a second terminal utilized by the target person PT is utilized in order to acquire position information of the target person PT, the second terminal may also include a sensor or the like for acquiring the current position.

(Operation of the Information Processing System 500)

From here, an operation example of the information processing system 500 according to the fifth example embodiment is described. Similarly to the first example embodiment, the information processing system 500 executes information processing for authenticating the target person PT in response to a request from a desiring person PW, and notifying of a result thereof. The information processing according to the present example embodiment is substantially similar to that according to the first example embodiment. In the present example embodiment, the information processing includes authentication and notification processing (step S502) instead of the authentication and notification processing (step S102) according to the first example embodiment.

Figure 33:
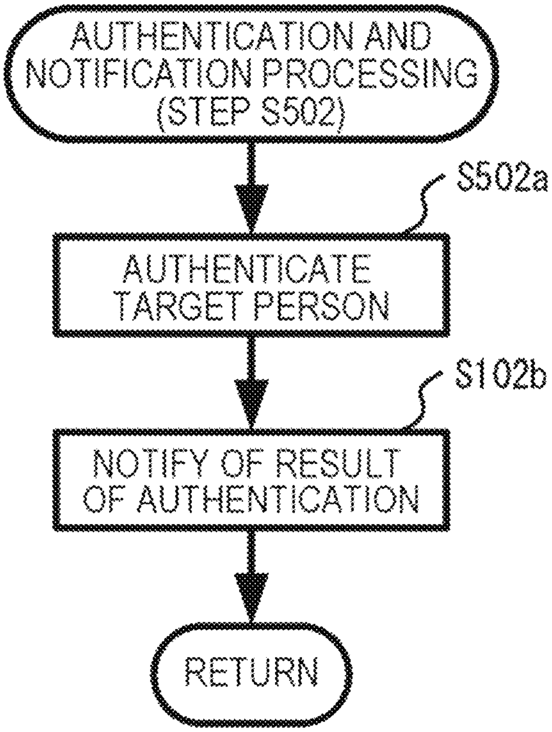
FIG. 33 is a flowchart illustrating a detailed example of authentication and notification processing according to the fifth example embodiment.

FIG. 33 is a flowchart illustrating a detailed example of the authentication and notification processing (step S502) according to the fifth example embodiment.

The execution unit 512 authenticates the target person PT by using the biological information of the target person PT included in the authentication request acquired in step S101 and the master biological information registered in the master information 111*a* (step S502*a*).

Specifically, for example, based on the master information 111*a*, the execution unit 512 extracts a registrant for whom a current position of the first terminal 102 included in an authentication request and position information included in the master information 111*a* have a previously determined relationship.

The previously determined relationship is that, for example, when position information indicates a current position of the registrant, a current position of the first terminal 102 and a position indicated by the position information are within a previously determined range. Moreover, for example, when position information indicates a range in which a registrant moves on duty, the previously determined relationship is that a current position of the first terminal 102 is included in a range indicated by the position information.

The execution unit 512 determines whether each of pieces of master biological information of the extracted registrant and the biological information of the target person PT match. Then, when the master biological information of the extracted registrant includes master biological information that matches the biological information of the target person PT, the execution unit 512 determines that authentication of the target person PT has succeeded. In contrast, when the master biological information of the extracted registrant does not include master biological information that matches the biological information of the target person PT, the execution unit 512 determines that authentication of the target person PT has failed.

The execution unit 512 executes step S102*b* similar to that according to the first example embodiment, and ends the information processing (see FIG. 8) similarly to the first example embodiment.

So far, the fifth example embodiment of the present invention has been described.

According to the present example embodiment, the authentication request further includes a current position of the first terminal 102. The master information 511*a* associates master biological information being biological information of a registrant with position information of a registrant. The authentication unit 504*a* extracts, based on the master information 511*a*, a registrant for whom a current position and position information of the first terminal 102 have a previously determined relationship, and authenticates the target person PT by using the master biological information and biological information of the extracted registrant.

Thereby, compared to determining whether each of pieces of master biological information of all registrants matches biological information of the target person PT as in step S102*a*, the number of execution of determination processing of whether the pieces of information match can be reduced. Therefore, it becomes possible to reduce a processing load for authenticating the target person PT.

Fourth Modified Example

In the fifth example embodiment, an example has been described in which a current position of the first terminal 102 and position information of the master information 111*a* are used in order to reduce a processing load for authenticating the target person PT. In order to reduce a processing load for authenticating the target person PT, a registrant ID (personal identification information) of the target person PT may be used.

The information processing apparatus according to the present modified example includes an authentication unit 604*a* that replaces the authentication unit 104*a*. Except for this point, the information processing system according to the present modified example may be configured similarly to the information processing system 100 according to the first example embodiment.

An authentication request according to the present modified example includes a registrant ID for identifying the target person PT. For example, the desiring person PW captures, by use of the sensor unit 121 (camera), a face image of the target person PT as well as a two-dimensional code contained in an identification card or the like of the target person PT and including the registrant ID. The sensor unit 121 (camera) generates an authentication request including a face image of the target person PT and a registrant ID.

Figure 34:
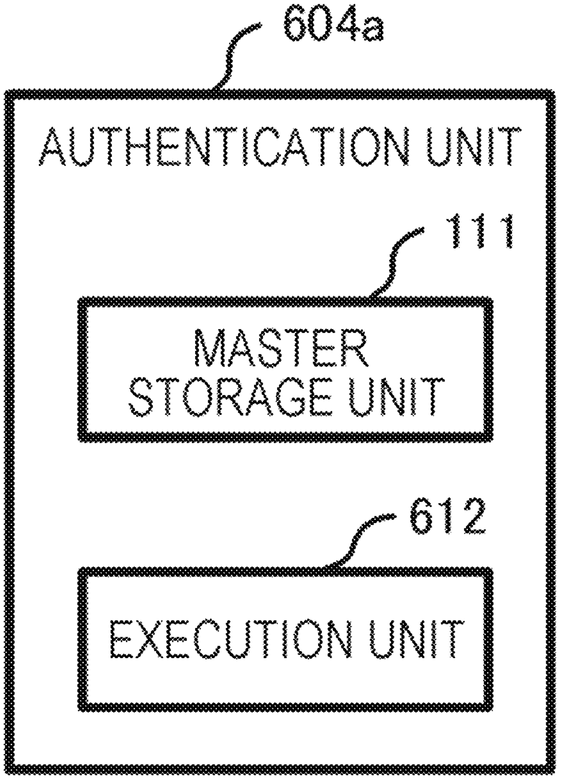
FIG. 34 is a diagram illustrating a detailed example of a functional configuration of an authentication unit according to a fourth modified example.

FIG. 34 is a diagram illustrating a detailed example of a functional configuration of the authentication unit 604*a* according to a fourth modified example. The authentication unit 604*a* includes a master storage unit 111 similar to that according to the first example embodiment, and an execution unit 612 that replaces the execution unit 112 according to the first example embodiment.

The execution unit 612 authenticates the target person PT by using biological information and a registrant ID.

Specifically, for example, the execution unit 612 acquires, based on the master information 111*a*, master biological information associated with a registrant ID included in an authentication request. The execution unit 612 authenticates the target person PT by using the acquired master biological information and biological information of the target person PT.

When the master biological information and the biological information of the target person PT match, the execution unit 612 determines that authentication of the target person PT has succeeded. On the other hand, when the master biological information and the biological information of the target person PT do not match, the execution unit 612 determines that authentication of the target person PT has failed.

According to the present modified example, the authentication request further includes a registrant ID (personal identification information) for identifying the target person PT. The authentication unit 604*a* authenticates the target person PT by using biological information and personal identification information.

Thereby, the number of determination processing of whether master biological information and the biological information of the target person PT match can be one. Thus, compared to determining whether each of pieces of master biological information of all registrants matches biological information of the target person PT as in step S102*a*, the number of execution of determination processing of whether the pieces of information match can be significantly reduced. Therefore, it becomes possible to further reduce a processing load for authenticating the target person PT.

Note that, each of the fifth example embodiment and the fourth modified example is not limited to the first example embodiment, and may be applied to the example embodiments 2 to 4, modified examples thereof, and the like.

Fifth Modified Example

In the first example embodiment, an example has been described in which the sensor unit 121 generates biological information of the target person PT. However, the request unit may acquire biological information of the target person PT from a third terminal such as an intercom terminal, an in-vehicle camera of a taxi, or an in-vehicle display of a taxi.

Figure 35:
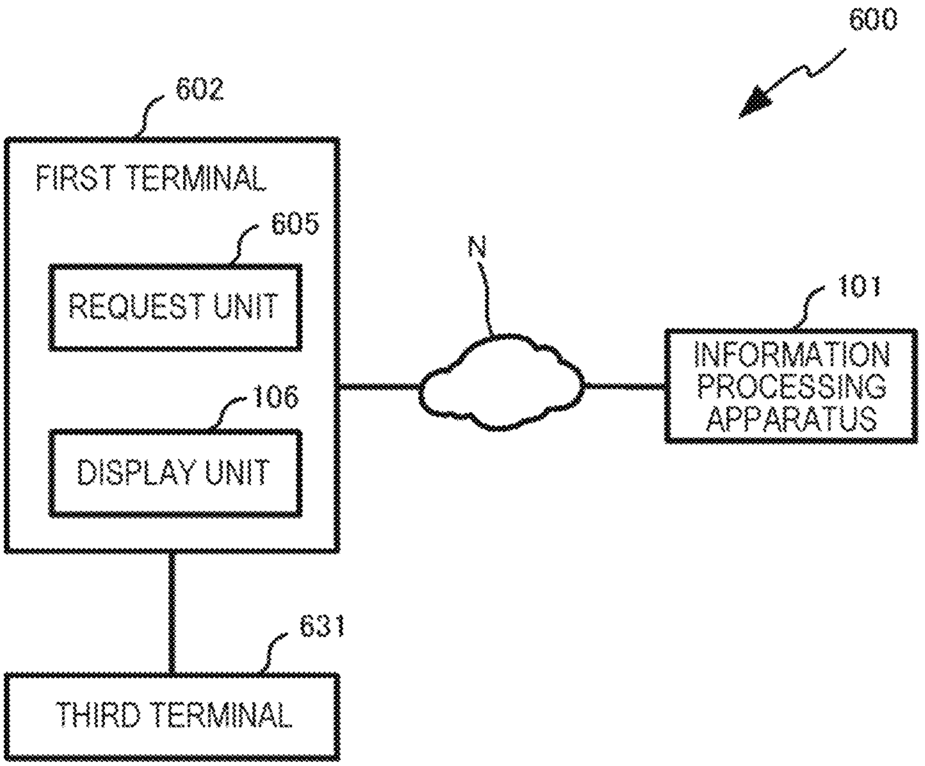
FIG. 35 is a diagram illustrating a configuration example of an information processing system according to fifth modified example.

FIG. 35 is a diagram illustrating a configuration example of an information processing system 600 according to fifth modified example. The information processing system 600 includes an information processing apparatus 101 similar to that according to the first example embodiment, and a first terminal 602 that replaces the first terminal 102 according to the first example embodiment. The information processing system 600 further includes a third terminal 631.

The third terminal 631 is an intercom terminal, an in-vehicle camera of a taxi, an in-vehicle taxi display of a taxi, or the like. The third terminal 631 and the first terminal 602 communicate with each other via, for example, Bluetooth, an indoor wireless local area network (LAN), or the like.

The first terminal 602 includes a request unit 605 that replaces the request unit 105 according to the first example embodiment, and a display unit 106 similar to that according to the first example embodiment.

The request unit 605 acquires biological information of the target person PT, and transmits an authentication request including the acquired biological information to the information processing apparatus 101. When a request of the desiring person PW is accepted, the request unit 605 according to the present modified example acquires the biological information of the target person PT from the third terminal 631, generates an authentication request including the acquired biological information, and transmits the generated authentication request to the information processing apparatus 101.

For example, when capturing by using the sensor unit 121 and generating biological information of the target person PT, it is normally necessary for the desiring person PW and the target person PT to face each other directly. When the target person PT presses an intercom, a face image of the target person PT captured with an outdoor camera is transmitted to the third terminal 631 (interphone terminal). The request unit 605 acquires, from the third terminal 631, image information including a face image captured with the outdoor camera, and, thereby, biological information of the target person PT can be acquired even when the desiring person PW and the target person PT do not face each other directly.

According to the present modified example, since authentication of the target person PT can be performed, for example, without opening a door of a house, it becomes possible for the desiring person PW to authenticate the target person PT more safely.

Moreover, for example, when the target person PT is a driver of a taxi, the driver usually faces forward, and, therefore, it may be difficult for the desiring person PW to capture a face image of the driver from front. The request unit 605 acquires, from the third terminal 631 being an in-vehicle camera, an in-vehicle display, or the like, image information capturing the driver and including a face image, and, thereby, the desiring person PW can easily acquire biological information of the driver being the target person PT. Thus, it becomes possible for the desiring person PW to more easily authenticate the target person PT.

The example embodiments and modified examples of the present invention have been described above with reference to the drawings, but are exemplifications of the present invention, and various configurations other than those described above can also be adopted.

Moreover, although a plurality of processes (pieces of processing) are described in order in a plurality of flowcharts used in the above description, an execution order of processes executed in each example embodiment is not limited to the described order. In each example embodiment, an order of illustrated processes can be changed to an extent that causes no problem in terms of content. Moreover, the example embodiments and modified examples described above can be combined to an extent that content does not contradict.

Some or all of the above-described example embodiments can also be described as, but are not limited to, the following supplementary notes.

1. An information processing apparatus including:
   an acquisition unit that acquires an authentication request including biological information of a target person for authentication from a first terminal utilized by a desiring person different from the target person; and a notification unit that notifies the first terminal of a result of authenticating the target person by using the biological information.

2. The information processing apparatus according to supplementary note 1, further including an authentication unit that authenticates the target person by using the biological information, when a previously determined execution condition is satisfied, wherein the notification unit notifies a result of authentication performed by the authentication unit.

3. The information processing apparatus according to supplementary note 2, wherein the execution condition includes a matter that there is an agreement of the target person to the authentication request, and the authentication unit includes a confirmation unit that transmits, to a second terminal utilized by the target person, confirmation of whether to agree to the authentication request, and an execution unit that authenticates the target person by using the biological information, and notifies a result of authentication, when a response indicating an agreement to the authentication request is acquired from the second terminal.

4. The information processing apparatus according to supplementary note 3, wherein the execution condition includes a previously set permission condition regarding the target person, and a matter that there is an agreement of the target person to the authentication request, and the execution unit authenticates the target person by using the biological information, and notifies a result of the authentication, when a response indicating an agreement to the authentication request is acquired from the second terminal and the permission condition is satisfied.

5. The information processing apparatus according to supplementary note 4, wherein the authentication unit further includes a condition storage unit for storing condition information indicating the permission condition.

6. The information processing apparatus according to supplementary note 4, wherein the authentication unit further includes an inquiry unit that inquires of a second terminal utilized by the target person about the permission condition, when the authentication request is acquired from the first terminal.

7. The information processing apparatus according to supplementary note 2, wherein the execution condition includes a previously set permission condition regarding the target person, and the authentication unit authenticates the target person by using the biological information, when the permission condition is satisfied.

8. The information processing apparatus according to supplementary note 7, wherein the authentication unit includes a condition storage unit for storing condition information indicating the permission condition, and an execution unit that authenticates the target person by using the biological information when the permission condition is satisfied.

9. The information processing apparatus according to supplementary note 7, wherein the authentication unit includes an inquiry unit that inquires of a second terminal utilized by the target person about the permission condition, when the authentication request is acquired from the first terminal, and an execution unit that authenticates the target person by using the biological information, when the permission condition acquired in response to the inquiry is satisfied.

10. The information processing apparatus according to any one of supplementary notes 4 to 9, wherein the permission condition includes at least one of a matter that the target person is on duty, a matter that it is in a previously determined time period in which the authentication is permitted, and a matter that there is a comprehensive prior agreement of the target person.

11. The information processing apparatus according to any one of supplementary notes 2 to 10, wherein the authentication request further includes a current position of the first terminal, and the authentication unit extracts, based on master information that associates master biological information being biological information of a registrant with position information of the registrant, the registrant for whom a current position of the first terminal and the position information have a previously determined relationship, authenticates the target person by using the master biological information of the extracted registrant and the biological information, and notifies a result of the authentication.

12. The information processing apparatus according to any one of supplementary notes 2 to 11, wherein the authentication request further includes personal identification information for identifying the target person, and the authentication unit authenticates the target person by further using the personal identification information, and notifies a result of the authentication.

13. An information processing system including:

the information processing apparatus according to any one of supplementary notes 1 to 12; and the first terminal, wherein the first terminal includes a request unit that acquires biological information of the target person, and transmits the authentication request including the acquired biological information to the information processing apparatus, and a display unit that acquires a result of authenticating the target person from the information processing apparatus, and displays the acquired result.

14. The information processing system according to supplementary note 13, wherein the request unit includes a sensor unit that generates biological information of the target person, and a request transmission unit that generates the authentication request including the generated biological information, and transmits the generated authentication request to the information processing apparatus.

15. The information processing system according to supplementary note 13, further including a third terminal that further generates biological information of the target person, and transmits the generated biological information to the first terminal, wherein the request unit acquires biological information of the target person from the third terminal, and transmits the authentication request to the information processing apparatus.

16. An information processing method including, by a computer:

acquiring an authentication request including biological information of a target person for authentication from a first terminal utilized by a desiring person different from the target person; and notifying the first terminal of a result of authenticating the target person by using the biological information.

17. The information processing method according to supplementary note 16, further including authenticating the target person by using the biological information, when a previously determined execution condition is satisfied.

18. The information processing method according to supplementary note 17, wherein the execution condition includes a matter that there is an agreement of the target person to the authentication request, the information processing method further including, in the authenticating, transmitting, to a second terminal utilized by the target person, confirmation of whether to agree to the authentication request, and authenticating the target person by using the biological information, when a response indicating an agreement to the authentication request is acquired from the second terminal.

19. The information processing method according to supplementary note 18, wherein the execution condition includes a previously set permission condition regarding the target person, and a matter that there is an agreement of the target person to the authentication request, the information processing method further including, in the authenticating, authenticating the target person by using the biological information, when a response indicating an agreement to the authentication request is acquired from the second terminal and the permission condition is satisfied.

20. The information processing method according to supplementary note 19, wherein the computer includes a condition storage unit for storing condition information indicating the permission condition.

21. The information processing method according to supplementary note 19, wherein the notifying further includes inquiring of a second terminal utilized by the target person about the permission condition, when the authentication request is acquired from the first terminal.

22. The information processing method according to supplementary note 17, wherein the execution condition includes a previously set permission condition regarding the target person, the information processing method further including, in the authenticating, authenticating the target person by using the biological information, when the permission condition is satisfied.

23. The information processing method according to supplementary note 22, wherein the computer includes a condition storage unit for storing condition information indicating the permission condition.

24. The information processing method according to supplementary note 22, further including, in the authenticating, inquiring of a second terminal utilized by the target person about the permission condition, when the authentication request is acquired from the first terminal, and authenticating the target person by using the biological information, when the permission condition acquired in response to the inquiry is satisfied.

25. The information processing method according to any one of supplementary notes 19 to 24, wherein the permission condition includes at least one of a matter that the target person is on duty, a matter that it is in a previously determined time period in which the authentication is permitted, and a matter that there is a comprehensive prior agreement of the target person.

26. The information processing method according to any one of supplementary notes 17 to 25, wherein the authentication request further includes a current position of the first terminal, the information processing method further including, in the authenticating, extracting, based on master information that associates master biological information being biological information of a registrant with position information of the registrant, the registrant for whom a current position of the first terminal and the position information have a previously determined relationship, and authenticates the target person by using the master biological information of the extracted registrant and the biological information.

27. The information processing method according to any one of supplementary notes 17 to 26, wherein the authentication request further includes personal identification information for identifying the target person, the information processing method further including, in the authenticating, authenticating the target person by further using the personal identification information.

28. A program for causing a computer to execute the information processing method according to any one of supplementary notes 16 to 27.

29. A storage medium storing a program for causing a computer to execute the information processing method according to any one of supplementary notes 16 to 27.

REFERENCE SIGNS LIST

100, 200, 300, 400, 500, 600 Information processing system
101, 201, 301, 401, 501 Information processing apparatus
102, 202, 602 First terminal
103 Acquisition unit
104*a*, 204*a*, 304*a*, 404*a*, 504*a*, 604*a* Authentication unit
104*b* Notification unit
105,605 Request unit
106, 206 Display unit
111, 211, 511 Master storage unit
111*a*, 211*a*, 511*a* Master information

112, 212, 312, 412, 512, 612 Execution unit
121 Sensor unit
122 Request transmission unit
213 Confirmation Unit
222, 422 Second terminal
223 Response unit
314 Condition storage unit
314*a* Condition information
415 Inquiry unit
424 Condition transmission unit
631 Third terminal

What is claimed is:

1. An information processing apparatus comprising:
a memory configured to store instructions; and
a processor configured to execute the instructions to:
acquire an authentication request including biological information of a service provider as a target person for authentication from a first terminal utilized by a service recipient as a desiring person different from the target person;
notify the first terminal of a result of authenticating the target person by using the biological information; and
authenticate the target person by using the biological information,
wherein notifying the first terminal of the result of authentication is executed, when a previously determined execution condition is satisfied,
the execution condition includes a matter that there is an agreement of the target person to the authentication request, authenticating the target person includes transmitting, to a second terminal utilized by the target person, confirmation of whether to agree to the authentication request, and authenticating the target person by using the biological information,
the execution condition includes a previously set permission condition regarding the target person, and a matter that there is an agreement of the target person to the authentication request, and notifying the first terminal of the result of authentication is executed, when a response indicating an agreement to the authentication request is acquired from the second terminal and the permission condition is satisfied.

2. The information processing apparatus according to claim 1, further comprising:
a condition storage for storing condition information indicating the permission condition.

3. The information processing apparatus according to claim 1, wherein
authenticating the target person further includes inquiring a second terminal utilized by the target person about the permission condition, when the authentication request is acquired from the first terminal.

4. The information processing apparatus according to claim 1, wherein
the permission condition includes at least one of a matter that the target person is on duty, a matter that it is in a previously determined time period in which the authentication is permitted, and a matter that there is a comprehensive prior agreement of the target person.

5. The information processing apparatus according to claim 1, wherein
the execution condition includes a previously set permission condition regarding the target person, and
notifying the first terminal of the result of authentication is executed, when the permission condition is satisfied.

6. The information processing apparatus according to claim 5, further comprising:
a condition storage for storing condition information indicating the permission condition, wherein authenticating the target person by using the biological information.

7. The information processing apparatus according to claim 5, wherein authenticating the target person includes inquiring a second terminal utilized by the target person about the permission condition, when the authentication request is acquired from the first terminal, and
authenticating the target person by using the biological information.

8. The information processing apparatus according to claim 1, wherein
the authentication request further includes a current position of the first terminal, and
authenticating the targeting person includes extracting based on master information that associates master biological information being biological information of a registrant with position information of the registrant, the registrant for whom a current position of the first terminal and the position information have a previously determined relationship, and
authenticating the target person by using the master biological information of the extracted registrant and the biological information.

9. The information processing apparatus according to claim 1, wherein
the authentication request further includes personal identification information for identifying the target person, and
authenticating the target person is executed by further using the personal identification information.

10. An information processing system comprising:
the information processing apparatus according to claim 1; and
the first terminal that transmits and receives data to and from the information processing apparatus each other, wherein
the first terminal includes
a memory configured to store instructions; and
a processor configured to execute the instructions to
acquire biological information of the target person,
transmit the authentication request including the acquired biological information to the information processing apparatus,
acquire a result of authenticating the target person from the information processing apparatus, and
display the acquired result.

11. The information processing system according to claim 10, wherein
the first terminal further includes a sensor that generates biological information of the target person, and
the processor included in the first terminal is configured to execute the instructions to: generate the authentication request including the generated biological information, and
transmit the generated authentication request to the information processing apparatus.

12. The information processing system according to claim 10, further comprising
a third terminal that further generates biological information of the target person, and transmits the generated biological information to the first terminal, wherein
the processor included in the first terminal is configured to execute the instructions to:
acquire the biological information of the target person from the third terminal.

13. An information processing method comprising, by a computer:

acquiring an authentication request including biological information of a service provider as a target person for authentication from a first terminal utilized by a service recipient as a desiring person different from the target person;

notifying the first terminal of a result of authenticating the target person by using the biological information; and authenticating the target person by using the biological information, wherein notifying the first terminal of the result of authentication is executed, when a previously determined execution condition is satisfied, the execution condition includes a matter that there is an agreement of the target person to the authentication request, authenticating the target person includes transmitting, to a second terminal utilized by the target person, confirmation of whether to agree to the authentication request, and authenticating the target person by using the biological information, the execution condition includes a previously set permission condition regarding the target person, and a matter that there is an agreement of the target person to the authentication request, and notifying the first terminal of the result of authentication is executed, when a response indicating an agreement to the authentication request is acquired from the second terminal and the permission condition is satisfied.

14. A non-transitory computer readable storage medium storing a program for causing a computer to execute:

acquiring an authentication request including biological information of a service provider as a target person for authentication from a first terminal utilized by a desiring person different from a service recipient as the target person;

notifying the first terminal of a result of authenticating the target person by using the biological information; and authenticating the target person by using the biological information, wherein notifying the first terminal of the result of authentication is executed, when a previously determined execution condition is satisfied, the execution condition includes a matter that there is an agreement of the target person to the authentication request, authenticating the target person includes transmitting, to a second terminal utilized by the target person, confirmation of whether to agree to the authentication request, and authenticating the target person by using the biological information, the execution condition includes a previously set permission condition regarding the target person, and a matter that there is an agreement of the target person to the authentication request, and notifying the first terminal of the result of authentication is executed, when a response indicating an agreement to the authentication request is acquired from the second terminal and the permission condition is satisfied.

* * * * *